US012657303B2

(12) United States Patent
Dean

(10) Patent No.: US 12,657,303 B2
(45) Date of Patent: Jun. 16, 2026

(54) SYSTEM FOR ASSURING CYBER SECURITY ACROSS SUPPLY CHAINS

(71) Applicant: BILBO LYFORD LIMITED, London (GB)

(72) Inventor: Julian Benedict Dean, Poole (GB)

(73) Assignee: BILBO LYFORD LIMITED, London (GB)

( * ) Notice: Subject to any disclaimer, the term of this patent is extended or adjusted under 35 U.S.C. 154(b) by 60 days.

(21) Appl. No.: 18/755,766

(22) Filed: Jun. 27, 2024

(65) Prior Publication Data

US 2026/0003966 A1     Jan. 1, 2026

(51) Int. Cl.
| | |
|---|---|
| *H04L 29/06* | (2006.01) |
| *G06F 8/65* | (2018.01) |
| *G06F 9/4401* | (2018.01) |
| *G06F 21/57* | (2013.01) |
| *G06F 21/64* | (2013.01) |
| *G06Q 10/08* | (2023.01) |
| *G07C 9/00* | (2020.01) |
| *H04L 9/32* | (2006.01) |

(52) U.S. Cl.
CPC ............. *G06F 21/57* (2013.01); *G06Q 10/08* (2013.01); *G07C 9/00174* (2013.01); *H04L 9/3213* (2013.01); *H04L 9/3247* (2013.01)

(58) Field of Classification Search
CPC ..... H04L 9/3247; H04L 9/3213; G06Q 10/08; G06F 21/57; G07C 9/00174
See application file for complete search history.

(56) References Cited

U.S. PATENT DOCUMENTS

| | | | | |
|---|---|---|---|---|
| 10,254,980 | B1 * | 4/2019 | Patel ...................... | G06F 3/061 |
| 10,873,456 | B1 * | 12/2020 | Dods ...................... | G06N 3/044 |
| 11,356,120 | B1 * | 6/2022 | Markle .............. | G06F 11/1076 |
| 2016/0085839 | A1 * | 3/2016 | D'Halluin ........... | G06F 16/2255 |
| | | | | 707/747 |
| 2019/0155922 | A1 * | 5/2019 | Kim ........................ | G06F 3/067 |
| 2019/0286515 | A1 * | 9/2019 | Raumann ............ | H03M 13/154 |
| 2020/0007513 | A1 * | 1/2020 | Gleichauf ............. | G06F 21/105 |

OTHER PUBLICATIONS

Enes Erdin et.al ,A Bitcoin payment network with re duce d transaction fees and confirmation times, www.elsevier.com/locate/comnet, Jan. 10, 2021 ,Computer Networks, https://doi.org/10.1016/j.comnet.2020.107098, (Last accessed : Jun. 27, 2024).

* cited by examiner

*Primary Examiner* — Mohammad A Siddiqi
(74) *Attorney, Agent, or Firm* — Jose Cherson Weissbrot

(57) ABSTRACT

A system that ensures safety across complex global networks has the potential to enhance data security, transparency, and trust. The system comprises a plurality of storage nodes and user devices. Each storage node is configured to maintain copies of one or more blockchains containing validated data records, and each blockchain is replicated across a subset of the storage nodes. User devices are configured to exchange blockchain data with the storage nodes. The storage nodes are interconnected through a toroidal network topology, and each block chain is replicated across the storage nodes of a toroidal sub-network.

24 Claims, 9 Drawing Sheets

SYSTEM FOR ASSURING CYBER SECURITY ACROSS SUPPLY CHAINS

FIELD OF THE INVENTION

The present disclosure relates generally systems and methods for assuring cyber security across supply chains, and more particularly to a system for assuring cyber security across supply chains provides significant potential to enhance data security, transparency, and trust within complex global networks.

BACKGROUND

In modern working environments, people spend a significant amount of time using computer systems to perform their daily tasks. This exposes them to sensitive information, which they must handle responsibly to ensure that business data records are maintained accurately and not misused. However, small and medium-sized enterprises (SMEs) face a significant challenge due to the numerous potential security vulnerabilities in their computer networks. Moreover, potential attackers are highly motivated and capable, which makes the compromise of any conventional business computer network inevitable.

A Byzantine Generals' Problem (BGP) is a thought experiment in computer science that describes the challenges of reaching consensus in a distributed system when some components may fail or be malicious. The Byzantine Generals' Problem is a challenging problem because it requires the generals to reach consensus on a common course of action even when they cannot trust all of the information they receive.

When a system is compromised, attackers can manipulate or access data that is meant to be confidential. This can lead to a decrease in the availability, integrity, or confidentiality of the information. As a result, the system may make decisions or take actions that harm the business or its customers. The majority of organizations involved in supply chains are small and medium-sized businesses (SMEs) that have limited resources to tackle cyber security challenges. However, these organizations need to ensure that their data records related to customers, operations, and suppliers remain uncompromised and will not be targeted by highly motivated attackers, whether from inside or outside the organization. This is essential to maintain the trust of stakeholders.

It is essential to note that contemporary processors in virtually all laptop, desktop, and server computers include undisclosed proprietary technology that may enable cyber-attacks on any system. Moreover, there is a lack of evidence to support the notion that these devices have not been further compromised by their manufacturers. Furthermore, even if these risks can be assumed, there are known vulnerabilities concerning attacks on the distribution, installation, configuration, and maintenance of such devices, before accounting for the hazards posed by human users and the installation of potentially untested or actively malevolent software. Therefore, it is crucial to be mindful of these risks and adopt appropriate measures to safeguard against cyber-attacks.

Small and medium-sized enterprises (SMEs) face a major challenge in reassuring third parties that their business records are being maintained securely and in compliance with contractual and regulatory obligations. This assurance also extends to their supply chain. Addressing cyber security risks, particularly potential ransomware attacks, are especially difficult for these enterprises. A holistic approach to cyber security is necessary to mitigate all possible threats and vulnerabilities that could lead to security breaches across the business operation. Unlike large enterprises, SMEs cannot always rely on cyber security techniques that require scarce cyber security personnel to evaluate and mitigate risks. This is because SMEs often have unique combinations of components in their systems that require tailored solutions to address the existential risks they face.

Therefore, there is a need for a system for assuring cyber security across supply chains provides significant potential to enhance data security, transparency, and trust within complex global networks.

SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key nor critical elements of all embodiments, nor delineate the scope of any or all embodiments.

The present disclosure, in one or more embodiments, relates to a system for assuring cyber security across supply chains that provides significant potential to enhance data security, transparency, and trust within complex global networks.

In one embodiment herein, a system comprises a plurality of storage nodes. In one embodiment herein, the plurality of storage nodes is connected in ring structures within a toroidal network topology. The plurality of storage nodes in each ring structure is fully connected to each other. The plurality of storage nodes is configured to store independently maintained copies of one or more blockchains that contain data records.

In one embodiment herein, each blockchain is replicated across a subset of the plurality of storage nodes connected in the ring structures, which extend in one or more dimensions.

In one embodiment herein, one or more user devices are configured to allow users to request for storing and retrieving the data records in the plurality of storage nodes that are connected in at least one ring structure. The one or more user devices are adapted to submit the data records by distributing erasure encoded shards of the data record to a subset of the storage nodes in one ring. In a preferred embodiment, the one or more user devices are adapted to autonomously communicate with the plurality of storage nodes for transferring data shards to the plurality of storage nodes connected in the ring structure.

In one embodiment herein, the plurality of storage nodes connected in the ring structure is adapted to autonomously replicate data shards received to all other storage nodes in the same ring, and rebuild the data records from a subset of the received data shards, and validate the rebuilt data records using digital signatures, and add valid data records to the specified blockchain.

In one embodiment, the data records are shared by the plurality of storage nodes using erasure encoding, and the data shards are distributed across a subset of the storage nodes within a ring, and these storage nodes replicate the data shards to all nodes in the ring. The plurality of storage nodes replicate the data records across a subset of the plurality of storage nodes, which are connected in multiple dimensions, within the toroidal network by one of several methods include a sequential replication, a parallel replication, and a hybrid replication.

The sequential replication is configured for distribution and replication of the data shards in one dimension at a time. The parallel replication is configured for distribution and replication of the data shards across one or more dimensions concurrently. The hybrid replication is configured for distribution and rebuilding of the data records using a combination of several methods. The one or more user devices are configured to shard blockchain requests, and distribute the data shards across the subset of one ring of nodes, either directly or via intermediary proxies. The one or more user devices include at least one of autonomous devices controlled by artificial intelligence (AI). The one or more user devices are adapted to autonomously communicate with the plurality of storage nodes for transferring data shards to a subset of the plurality of storage nodes connected in the ring structure.

In one embodiment herein, the system further comprises one or more autonomous user equipments. The one or more autonomous user equipments are configured to autonomously process and update the data records in the blockchains in response to one or more instructions added to the blockchains by authorized persons without direct inputs or outputs, thereby ensuring encrypted data records can be processed securely without enabling access to the data by any human user.

In one embodiment herein, the one or more autonomous user equipments are further configured to redact sensitive information from source documents, extract specific information from sensitive source documents, aggregate or statistically analyze information from multiple source data records, conditionally process individual source data records and reference data based on patterns within the source data, perform complex processing that requires source data from multiple data records and reference data, and perform hybrid combinations of any of the previously defined processing types, optionally in combination with other processing types.

In one embodiment herein, each storage node and each user device comprises a network interface, an output interface, an input interface, a storage interface, a secure processor, an output processor, an input processor, and a network processor.

The network processor is connected to the network interface. The network interface is configured to allow the network processor to initiate connections to other devices on external networks. The other devices include the user devices.

The input processor is configured to connect with the input interface for receiving information from the authorized users, and send information to the network processor and the secure processor, and also receive information from the output processor through respective unidirectional communication links.

The secure processor is configured to receive the information from the input processor, and send the information via the output processor through respective unidirectional communication links.

The output processor is configured for receiving the information from the network processor and the secure processor and displaying the information to the authorized users through the output interface, and optionally sending the information to the input processor. The network processor, the input processor, the secure processor, and the output processor are configured to validate the received information and add validation data to the transmitted information.

The storage interface is configured to receive and send data to the input processor or the secure processor from temporary and persistent storages through respective unidirectional communication links.

In another embodiment herein, the one or more user devices are adapted to autonomously communicate with the plurality of storage nodes through a proxy server.

In one embodiment herein, the one or more user devices and security hardened devices are enclosed within a tamper-resistant and tamper-evident enclosure. The security hardened device is adapted to be assembled within a security hardened facility that is operable to automatically collect and store cyber security assurance data within a blockchain, whereby interested parties are able to view evidence of the inspection and assembly of components, device testing, enclosure sealing, and device identification, plus reviews and security assessments of assurance data by third-parties. Further, the one or more user devices, and one or more input and output devices, and one or more privacy shield devices are enclosed within the tamper-resistant and tamper-evident enclosure of a security hardened workstation. The security hardened workstation comprises a lockable door for enabling the authorized users to access the one or more input and output devices while preventing tampering with the privacy shield devices and restricting access to the user devices. The security hardened workstation adapted to be assembled within the security hardened facility that is operable to automatically collect and store cyber security assurance data within a blockchain. The privacy shield devices include one or more of physical louvres that are angled to allow viewing from a specific region only, or multi-layered printing on clear materials to achieve the same effect.

In one embodiment herein, the plurality of storage nodes is further configured to store erasure encoded reference data shards that are distributed across the plurality of storage nodes connected in the ring structure, operable to collectively preserve integrity and availability of stored data records, and control access to the data records by consensus between the plurality of storage nodes connected in the ring structure.

In one embodiment herein, the plurality of storage nodes and user devices are configured to process the data records and associated digital signatures stored within the blockchains, shards of associated reference data, identity authors of the each data record, context of each data record, the context of associated reference data, and the cryptographic hash of the contents of each data record and any associated reference data.

In one embodiment herein, the data records in the blockchains and associated reference data includes information that represents one or more of user generated requests, user and machine generated statements of fact, user or machine generated reference data, user and machine generated badges of authenticity, and supporting evidence, wherein the supporting evidence optionally includes human-viewable surveillance of the real world and sensor data captured from the real world.

In one embodiment herein, the user devices are configured to encrypt the data records proposed for storage in the blockchain before distributing it across the plurality of storage nodes, wherein the user devices are configured to encrypt reference data before creating reference data shards that are distributed across the plurality of storage nodes. The encryption keys used to encrypt the data records are themselves encrypted and stored within the data records that are previously stored in the blockchain. The recursive process of managing encryption keys involve both symmetric encryption and asymmetric encryption.

In one embodiment herein, the plurality of storage nodes is configured to permanently delete blocks of data records within the blockchain without compromising the integrity of the blockchain by using Merkel Trees or Merkel Lists to represent the blockchain structure.

In one embodiment herein, the user devices are further configured to use a security token to digitally sign transactions that contain one or more data records intended for storage in the blockchain using the private key stored in the security token, and subject to a physical action detected by the security token that confirms consent of the user. In one embodiment herein, the security token stores a private key associated with an authorized user.

In one embodiment herein, the user devices are further configured to require specific types of data records to be digitally signed using a private key that is stored on another security token that associated with the authorized user.

In one embodiment herein, the user devices are further configured to apply additional layers of encryption, which can only be decrypted by the autonomous user equipments that are designated as gatekeepers. The autonomous user equipments are configured to perform additional validation on the requests before deciding whether to remove the additional layers of encryption on behalf of a specific user of a specific user device at a specific point in time.

In another aspect of the invention, a method for assuring cyber security across supply chains through a computing system is disclosed. At one step, the plurality of storage nodes store independently maintained replicated copies of the one or more blockchains containing data records within the toroidal network topology. At next step, requests are received from the one or more user devices for storing and retrieving data records within the plurality of storage nodes connected in at least one ring structure.

At another step, the erasure encoded shards of the data records are distributed to a subset of the plurality of storage nodes in the at least one ring structure by the one or more user devices. At another step, the received data shards are autonomously replicating to the plurality of storage nodes within the at least one ring structure.

At another step, the data records are rebuilt from a subset of the received data shards within the at least one ring structure. Further at another step, the rebuilt data records are validated using digital signatures within the at least one ring structure, and valid data records are added to the specified blockchain within the at least one ring structure. Next, the data records are sharded using erasure encoding, and distributing the data shards across a subset of the plurality of storage nodes within the at least one ring structure. Later, the data shards are replicated to each storage node in the at least one ring structure and the data records are rebuilt from a subset of the shards. The data records are replicated across the plurality of storage nodes within the toroidal network topology across multiple dimensions using one of sequential replication, parallel replication, or hybrid replication methods.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1:
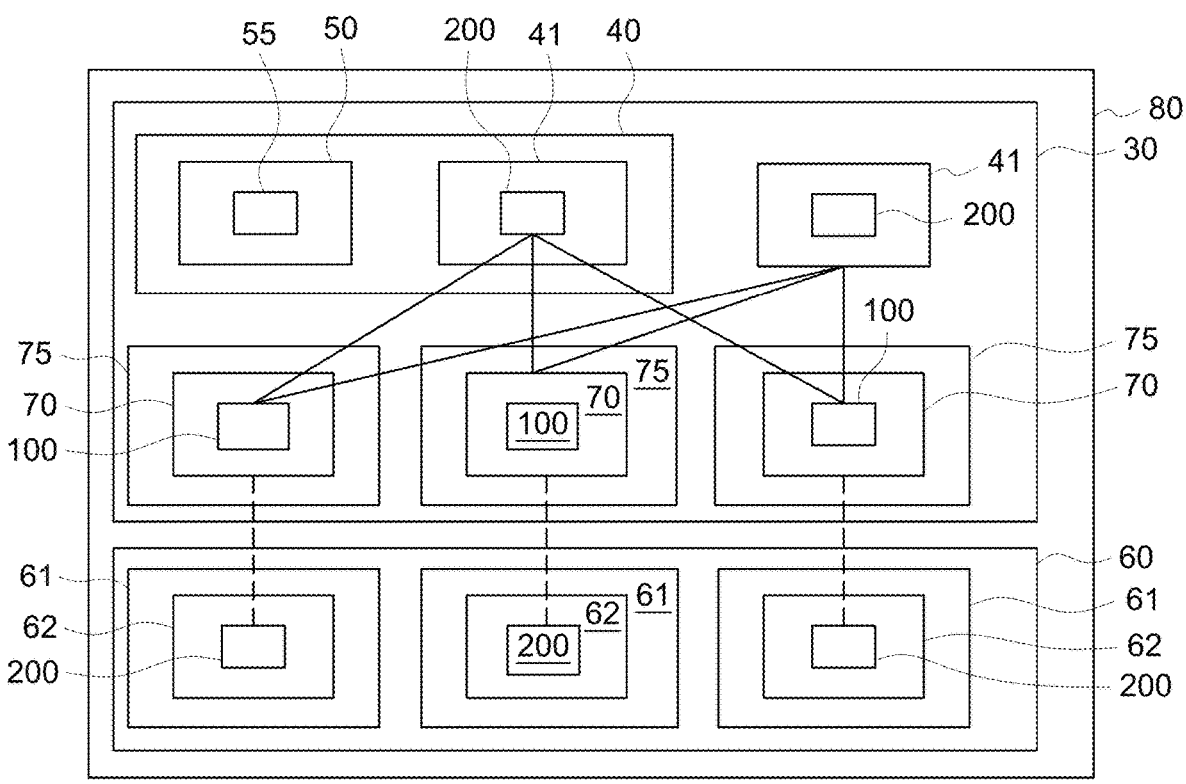
FIG. 1 illustrates a block diagram of a system an anticipated global context, in accordance with embodiments of the invention.

Reference will now be made in detail to the present preferred embodiments of the invention, examples of which are illustrated in the accompanying drawings. Wherever possible, the same reference numerals are used in the drawings and the description to refer to the same or like parts.

Figure 9:
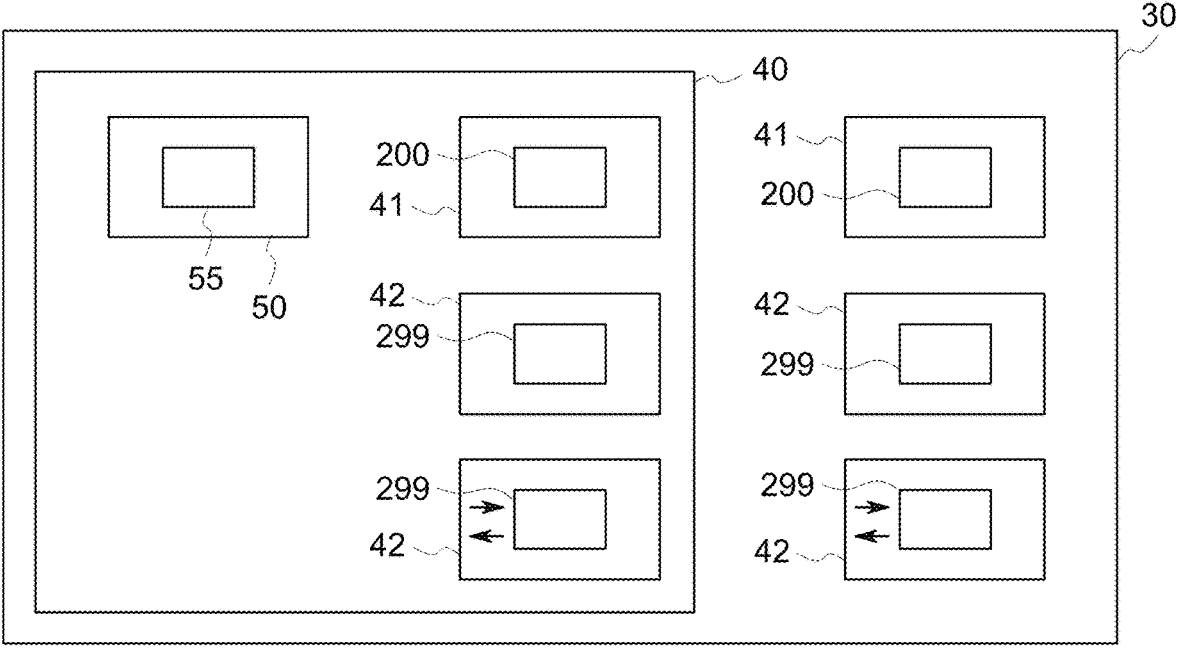
FIG. 9 illustrates a block diagram of another preferred embodiment of the system, in accordance with embodiments of the invention.

FIG. 1 refers to a perspective view of a system 30 within an anticipated global context 80. The system 30 comprises a plurality of storage nodes 100, one or more user devices 200, and one or more autonomous user equipments 299 (as shown in FIG. 9). In one embodiment herein, the plurality of storage nodes 100 is connected in ring structures 10 within a toroidal network topology. The plurality of storage nodes 100 in each ring structure 10 are fully connected to each other. The plurality of storage nodes 100 are configured to maintain one or more blockchains 50 that contain data records 55 combined with distributed storage of encrypted reference data shards that have been validated by the plurality of storage nodes 100.

In one embodiment herein, each blockchain 50 is replicated across a subset of the plurality of storage nodes 100 connected in the ring structures 10, which are connected in multiple dimensions using at least one data distribution replication method without unnecessary data transmissions between the plurality of storage nodes 100.

In one embodiment herein, the user devices 200 are configured to allow users to request for storing and retrieving the data in the plurality of storage nodes 100 that are connected in at least one ring structure 10. The user devices 200 are adapted to communicate with the plurality of storage nodes 100 for transferring data shards to the plurality of storage nodes 100 connected in the ring structure 10.

In one embodiment herein, the plurality of storage nodes 100 connected in the ring structure 10 is adapted to autonomously generate or recreate the data records 55 from the data shards and validate the data records 55 before deciding whether to replicate the data records 55 to its copy of the blockchains 50.

For example, the global network 80 where organizations 40 can securely store confidential business records 55 using private, encrypted blockchains 50. The system 30 allows authorized individuals 41 (inside and outside the organization) to access and update the confidential business data 55. Additionally, the organizations 40 entrust independent groups 60 of trustees 61 to manage the blockchains 50. The trustees 61 rely on administrators 62 who utilize the user devices 200 to manage the storage nodes 100 located within cloud service regions 70, operated by independent, potentially untrusted cloud service providers 75.

The system 30 is shown in FIG. 1 within the preferred global context 80, which is comprised of organizations 40, which want to maintain confidential business records 55 within encrypted private blockchains 50, for the benefit of authorized individuals 41 inside and outside the organization. The global network 80 is very significant for supply chain collaboration, because confidential business records 55 are maintained in the encrypted private blockchains 50 for the benefit of authorized individuals 41, rather than the individual business organization 40, which means that the authorized individuals 41 can continue to rely upon the records 55, even in the absence of the original organization 40.

This means that, regardless of what happens to the organization 40, the customers can be assured by the organization 40 that the pertinent confidential business records will be accessible to them in compliance with established policies. This can be extended to other supply chain organizations 40 to provide a comprehensive product traceability record that covers everything from the finished product that the customer purchases to the raw materials used to manufacture each component's sub-component and the equipment and processing used at every stage of production.

For secure and efficient management of confidential business records 55, the organizations 40 can delegate control of encrypted private blockchains 50 to entrusted groups 60 such as trustees 61. The trustees 61 act on behalf of all stakeholders (interested parties) and manage the blockchain's operation and maintenance through administrators 62 and the user devices 200 autonomously connected to storage nodes 100 across cloud services. For complete transparency and trust, the identities of all involved parties (organization, trustees, and stakeholders) along with their legal agreements outlining relationships and responsibilities are permanently documented within the blockchain 50 itself.

The trustees 61 are expected to leverage cloud services 75 for hosting the storage nodes 100, fostering a distributed and secure system 30. Each trustee 61 can choose to host the node 100 themselves or engage a cloud service provider 75. Further, shared responsibility ensures data security and integrity. Deleting data or blockchains 50 requires consensus among trustees, while individual trustees 61 can manage cloud storage payments. This distributed approach ensures resilience and accountability for protecting confidential business records 55.

Through the system 30, trustees 61 collectively guarantee that authorized individuals 41 can access relevant business data based on predefined permissions documented in the blockchain 50 itself.

Figure 2:
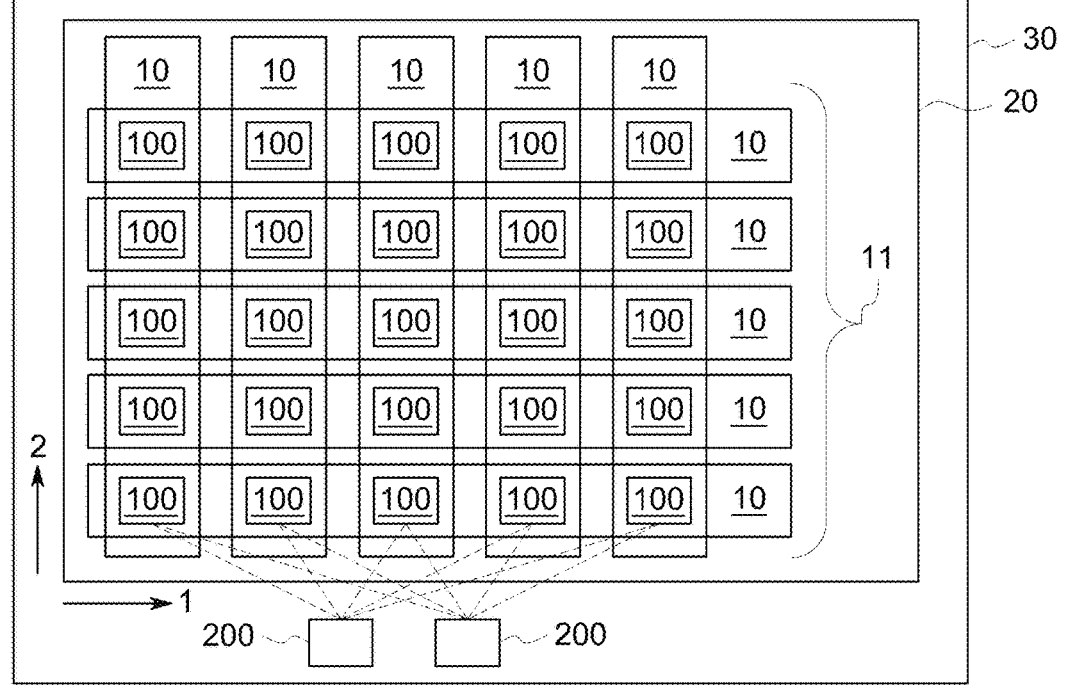
FIG. 2 illustrates a preferred embodiment of the system, in accordance with embodiments of the invention.

FIG. 2 refers to a preferred embodiment of the proposed system 30. In one embodiment herein, each blockchain 50 is replicated across a subset of the plurality of storage nodes 100 connected in the ring structures 10, which are connected in multiple dimensions using at least one data distribution replication method without unnecessary data transmissions between the plurality of storage nodes 100. In one embodiment, the storage nodes 100 are interconnected in a toroidal network topology 20, wherein the system 30 built on a multi-layered network.

In one embodiment, the storage nodes 100 are interconnected as a 2D grid in a set of fully connected toroidal network primary rings 11, where each square represents at least one storage node 100. The storage nodes 100 are cleverly connected in two ways horizontal rings, and vertical rings. Each row 1 of the storage nodes 100 forms a fully connected loop, ensuring data can easily flow across the system 30 horizontally. Each column 2 of the storage nodes 100 also forms a fully connected loop, enabling data to move vertically as well.

FIG. 2 illustrates the system 30 where the storage nodes 100 work together. The storage nodes 100 are operatively connected in a special network layout, similar to a 3D maze, where information can easily flow around even if one connection is blocked. Each storage node 100 houses one or more blockchains 50 that store confidential business record 55. Authorized persons can access and update this data using their devices. They connect to specific nodes 100 within a designated "ring" within the network, ensuring efficient access to the information they need. The system 30 operates on behalf of organizations, allowing them to securely store and share sensitive data with authorized individuals.

The organizations that implement primary toroidal network rings 11 of storage nodes 100 within the system 30, mutually agree to allow their storage nodes 100 to participate in toroidal network rings 10 in additional dimensions, for the purpose of replicating additional Blockchains 50, which provide evidence that proves beyond all reasonable doubt whether the private Blockchains 50 of the organization 40 are correct or have been subject to tampering.

Organizations allow storage nodes 100 to maintain one or more private Blockchains 50, which are pegged to a global Blockchain 50 by adding their block hashes to the global blockchain 50. Organizations also optionally allow storage nodes 100 to maintain one or more provenance Blockchains 50, so they can peg their private Blockchains 50 to global Blockchain 50 indirectly through a series of provenance Blockchains 50, distributed across successively larger subsets of the toroidal network topology 20.

The system 30 shown in FIG. 2 is comprised of a plurality of storage nodes 100 that are connected in a toroidal network topology 20 over switched connections, such as the internet, with the user devices 200 connected to multiple storage nodes 100 within a primary ring 11.

Although the FIG. 2 shows the toroidal network topology 20 as two dimensional, comprising five toroidal network primary rings 11 oriented in the primary dimension 1 (horizontal), and five toroidal network rings 10 oriented in a second dimension 2 (vertical), there is no upper limit on the number of nodes 100 in each ring structure 10 (including 11), or on the number of orthogonal dimensions in the toroidal network topology 20, or any requirement for the number of nodes 100 in any dimension to be uniform across the network.

Figure 3:
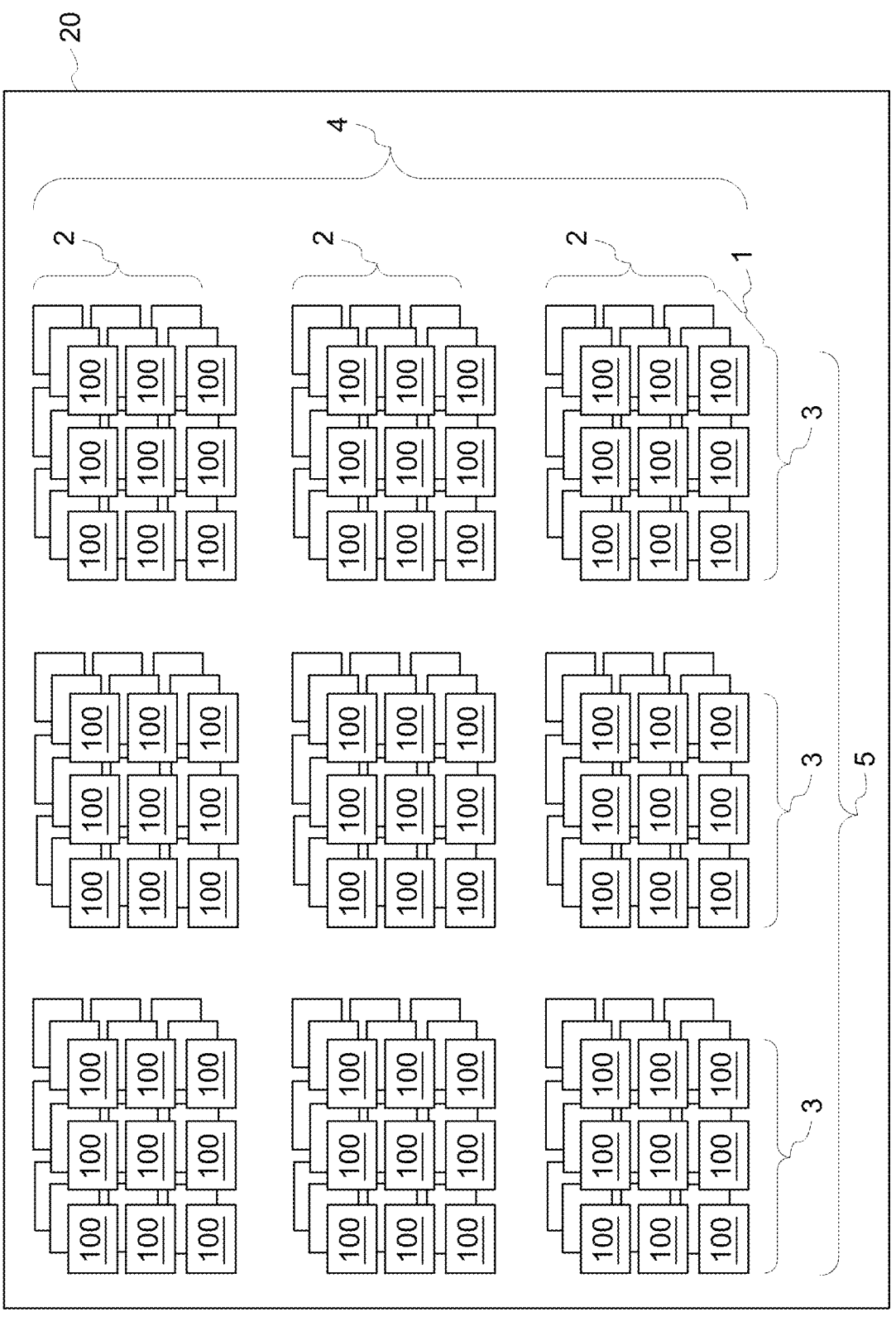
FIG. 3 illustrates a block diagram of a 5D toroidal network of the system, in accordance with embodiments of the invention.

FIG. 3 depicts a complex network called a 5D toroidal network topology 20. This intricate structure allows data to flow seamlessly even if some connections are blocked. Within the toroidal network topology 20, each inner square represents a primary ring 11 dedicated to storing encrypted private blockchains 50 for specific organizations. These rings are interconnected in five dimensions. Primary dimension 1 (horizontal), each row of squares connects horizontally, allowing data to flow across the network. Secondary dimension 2 (vertical), each column of squares connects vertically, enabling data movement up and down. Third dimension 3 (horizontal within squares), this dimension connects squares within each inner square. Fourth dimension 4 (vertical squares), this connects squares vertically, forming a larger square of squares. Fifth dimension 5 (vertical squares), this creates another layer of squares, further expanding the toroidal network topology 20.

To access the toroidal network topology 20, each storage node 100 has an address such as $A_5,A_4,A_3,A_2,A_1$, where each number corresponds to its specific location within each dimension. The system 30 can be adapted to accommodate more organizations by adding more dimensions, ensuring ample storage space. The number of dimensions in the toroidal network represented in FIG. 3 can be extended by replicating the structure multiple times in either the vertical or horizontal direction, with each node in the current structure connected to the corresponding nodes 100 in the new structures in order to create the new dimension.

The new dimension can optionally be populated incrementally, with primary rings 11 for new organizations being added to the expanded structure on demand, so that the first group of storage nodes 100 in the new dimension is always fully populated, but subsequent groups of storage nodes 100 in the new dimension are only populated as required, with the additional structures initially only having one primary ring 11, but as the number of organizations increases the number of dimensions in the additional groups of storage nodes 100 gradually increase, until each group of storage nodes 100 becomes complete, when organizations will be added to the next group of storage nodes 100, until the toroidal network is full, and the whole process needs to be repeated to add another dimension when more organizations are added.

Each organization that joins the toroidal network topology 20 agrees to maintain a minimum of three storage nodes 100 that are connected to the toroidal network topology 20 in all available dimensions, but can withdraw from the toroidal network topology 20 by replicating a digitally signed withdrawal request data record 55 across the storage nodes 100 of the toroidal network topology 20 for insertion into the global Blockchain.

In the event of an organization that has joined and not subsequently withdrawn from the toroidal network topology 20 failing to meet its obligations to the other organizations within the toroidal network topology 20, the storage nodes 100 that should be connected to the storage nodes 100 of the primary ring 11 of the offending organization may request that organization is removed from the toroidal network topology 20, and once the majority of storage nodes 100 that should be connected to the storage nodes 100 of the primary ring 11 have registered the request in the global Blockchain the removal will take immediate effect.

When an organization withdraws or is removed from the toroidal network topology 20, the addresses of the storage nodes 100 in its primary ring 20 will be automatically reallocated to the organization with the highest node addresses, and the storage nodes 100 of that organization will connect to their newly allocated neighbors. Organizations 40 may provision private blockchains 50 for their own usage, and can optionally provide the private blockchains 50 and associated reference data storage to third-parties.

The agreements between the storage nodes 100 of the organizations 40 may specify mandatory and recommended requirements for how the storage nodes 100 within the primary rings 11 are managed, specifically defining requirements to document the ownership of equipment or cloud service accounts used to provision the storage nodes 100, and maintain some level of independence between the entities involved.

The system 30 should ideally be supported by a comprehensive specification, which attempts to address all aspects of the system 30 design and implementation that are relevant to cyber security within many (but not all) small and medium businesses, and attempts to address all aspects of the system 30 development, maintenance and operations processes that contribute to the holistic cyber security of the system 30.

The system 30 specification should ideally be further supported by a reference implementation that provides reference modules that implement all aspects of the secure business management system 30, which is intended to support independent development of alternative implementations of all system 30 modules, so that organizations can configure their storage nodes 100 and user devices 200 to use their preferred module implementations, and can replace modules proactively in response to cyber security advisories.

The secure business management system 30 is specifically intended to take advantage of commodity services and components that can be purchased from alternative sources, and is specifically designed to mitigate potential security vulnerabilities that may be present within individual components, by using consensus across components from multiple suppliers.

It is envisaged that nodes 100 in the toroidal network topology may also be members of other networks, so for example the nodes 100 that support private blockchains 50 may be randomly assigned addresses within the multidimensional network. Also global blockchains 50 may support crypto currencies, tokens and NFTs, which may be delegated to provenance blockchains 50. Provenance blockchains 50 may be constructed from the bottom up, and include records intended for inclusion in the global blockchain, so that the nodes 100 of any toroidal sub-network could detect critical failures of compromise in higher dimensions, and collectively decide to opt-out of the higher dimension, by creating an alternative structure in the higher dimension.

Figure 4:
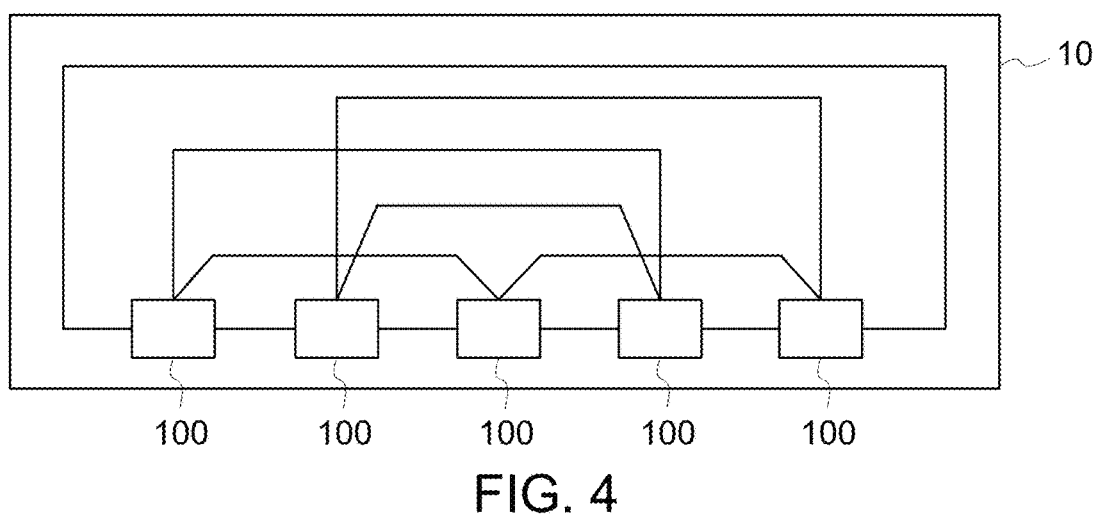
FIG. 4 illustrates a block diagram of a linear representation of a one dimensional toroidal network ring of the system, in accordance with embodiments of the invention.

FIG. 4 shows a linear representation of a one-dimensional ring structure 10, including the additional links to illustrate the connections between nodes 100. The system 30 is shown in FIG. 4 with a linear representation of a generic fully connected ring structure 10 (aka a mesh network) of storage nodes 100 supports replication of blockchains 50 that contain confidential business records 55 across all storage nodes 100 of the ring structure 10, with optional distributed storage across the storage nodes 100 of digital artefacts that are referenced in the blockchain 50.

The ring structure 10 as shown in FIG. 4 can represent a primary toroidal network ring 11 of storage nodes 100 that replicate blockchains 50 and distribute referenced digital artefact storage, or can optionally represent toroidal network rings 10 in other dimensions, which collectively implement a toroidal network topology 20, for the purpose of replicating global blockchains 50 and provenance blockchains 50 on behalf of the organizations that operate storage nodes 100 in the system 30.

Although the FIG. 4 shows the ring structure 10 as comprising five nodes 100, there is no upper limit on the number of storage nodes 100 that may be present in any ring structure 10, but there is a practical lower bound of three, because of the requirement for consensus.

Figure 5:
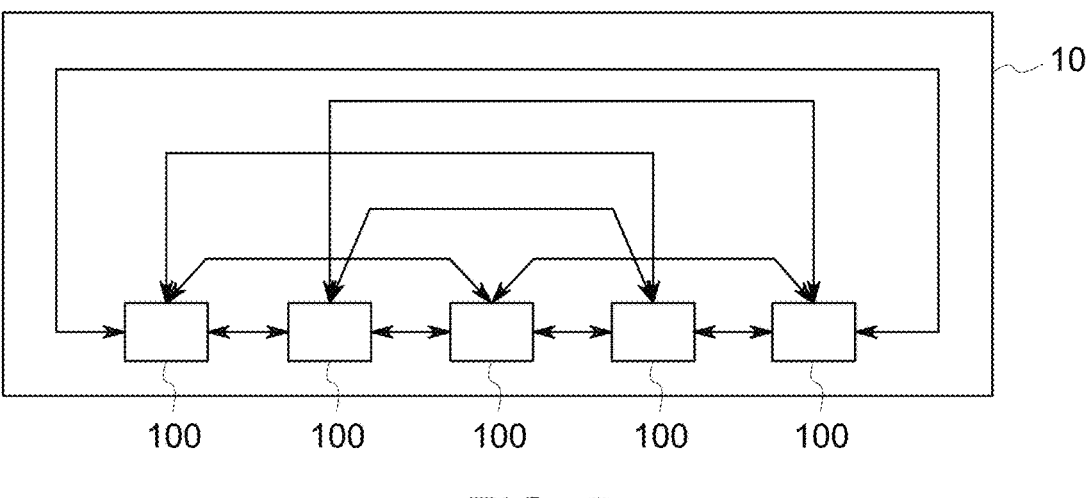
FIG. 5 illustrates a block diagram of a generic shard replication data flows within a toroidal network ring, in accordance with embodiments of the invention.

FIG. 5 shows the generic shard replication data flows within a ring structure 10, illustrating the flow of previously distributed message shards from every storage node 100 to every other storage node 100. The ring structure 10 shown in FIG. 5 with shard replication data flows illustrates how data shards are replicated from every storage nodes 100 in the ring structure 10 to every other storage node 100 in the ring structure 10, which has not previously received them.

Although the FIG. 5 shows data flows from each node 100 in a ring structure 10 to all other nodes 100 in the ring structure 10, in the special case of replication of shards that were previously distributed from the storage node 100 in the ring structure 10, there is no requirement during replication for additional data shards or reference data shards to flow from the distributing node 100. Although the FIG. 5 shows distribution of shards from one storage node 100 to the other storage nodes 100 in the ring structure 10, it should be noted that these data flows normally only include data shards, but may include reference data shards.

Figure 6:
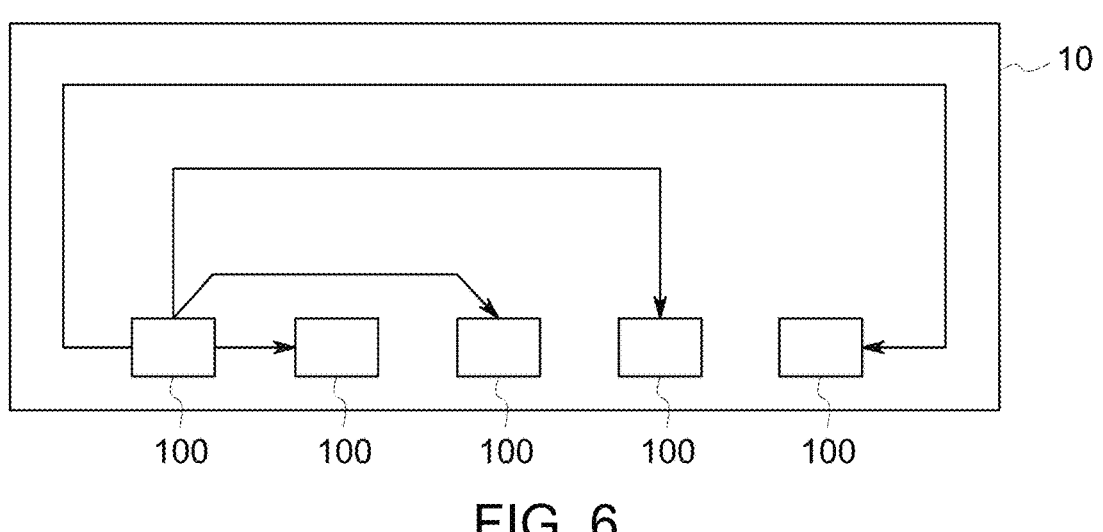
FIG. 6 illustrates a block diagram of shard distribution data flows from one storage node in the toroidal network ring, in accordance with embodiments of the invention.

FIG. 6 shows the shard distribution data flows from one storage node 100 in the ring structure 10 to other storage nodes 100 in the ring structure 10. The shard distribution data flows shown in FIG. 6 illustrate the distribution of shards from one storage node 100 in the ring structure 10 to a subset of the storage nodes 100 in the ring structure 10.

Figure 7:
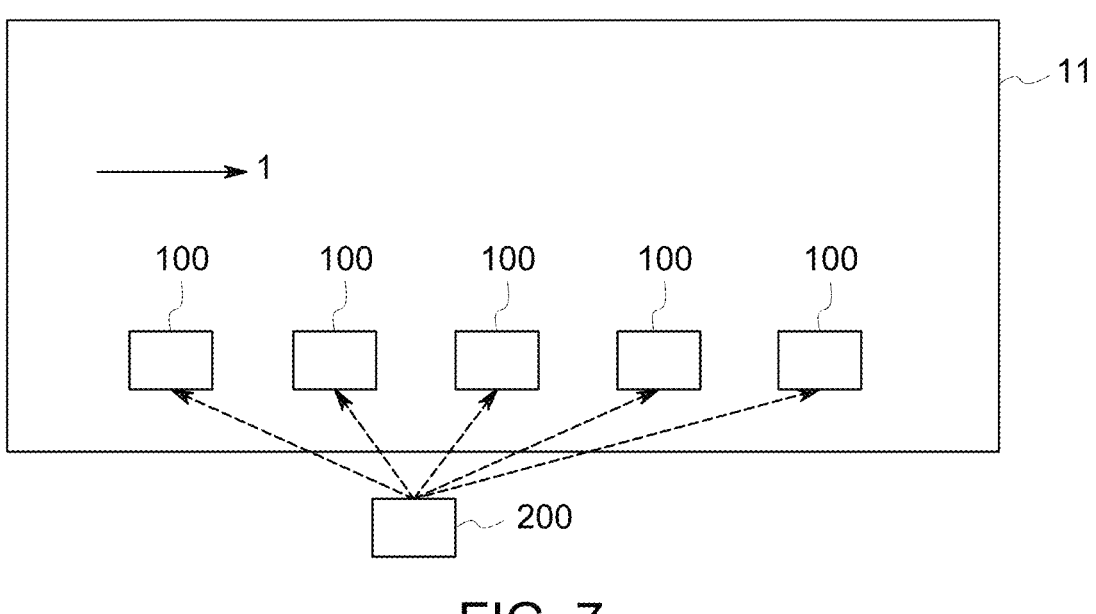
FIG. 7 illustrates a block diagram of shard distribution data flows from one user device to storage nodes, in accordance with embodiments of the invention.

FIG. 7 shows the shard distribution data flows from one user device 200 to storage nodes 100 in a primary toroidal network ring 11 that is oriented in the primary dimension 1. The reference data and shard distribution data flows shown in FIG. 7 illustrates the distribution of data shards from one user device 200 to a subset of the storage nodes 100 in a primary toroidal network ring 11 that is oriented in the primary dimension 1.

Each toroidal network primary ring 11 as shown in FIG. 7 is oriented in the primary dimension 1 and a subset of the storage nodes 100 receive data shards and reference data shards from user devices 200 and temporarily store reference data shards and replicate data shards to all other nodes 100 in the ring 11, with the effect that all storage nodes 100 in the ring 11 will receive all data shards, which will allow all storage nodes 100 to rebuild the original data records 55 a subset of the received data shards.

Once each node 100 has rebuilt the data records 55 from the data shards it will validate the record, before deciding whether to add the record to its copy of the blockchain, and will only take action in response to validated data records 55, where the action may include persistently storing or retrieving reference data from persistent storage.

Figure 8:
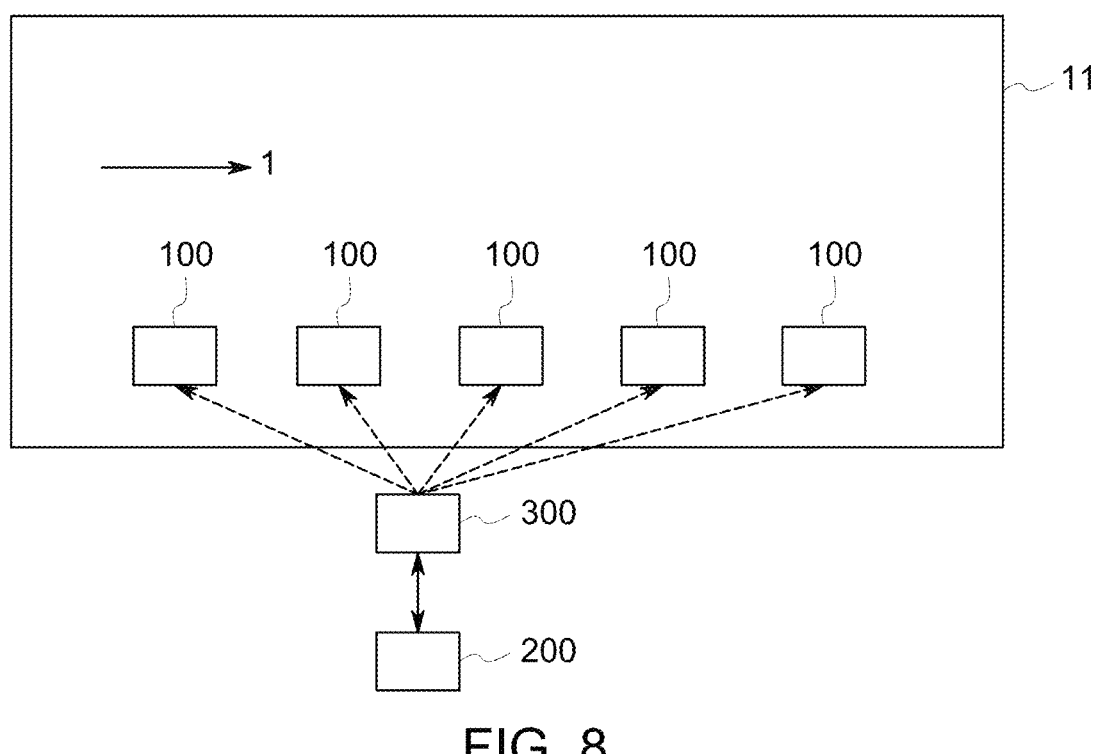
FIG. 8 illustrates a block diagram of user device connection with storage nodes, in accordance with embodiments of the invention.

FIG. 8 shows that the user device 200 may optionally connect to storage nodes 100 of primary toroidal network ring 11 via a proxy server 300, which may be desirable to reduce the number of network connections required by the user device 200, or to isolate the user device from the storage nodes 100, so that attacks on the user device 200 do not identify the IP addresses of the storage nodes 100, which might facilitate cyber-attacks upon them.

It is anticipated that this shard distribution and replication mechanism will also be used within toroidal network topologies, and that it may be adapted to distribute shards across multiple dimensions before replicating them across the same dimensions, so that the number of replicas of the blockchain maintained by this method is not limited to the number of nodes 100 in a ring.

It is also anticipated that this distribution across multiple dimensions could be applied to reference data shards, so that reference shards received from the user devices 200 are then distributed across storage nodes 100 in higher dimensions.

FIG. 9 illustrates the system 30 with the user devices 200, and the autonomous user equipments 299. In one embodiment herein, the autonomous user equipments 299 are configured to autonomously process and update the data records 55 in the blockchains 50 in response to one or more instructions added to the blockchains 50 by authorized persons 42 without direct inputs or outputs, thereby ensuring to prevent unauthorized users to decrypt the data records 55 stored within the blockchains 50.

In one embodiment herein, the autonomous user equipments 299 are further configured to redact sensitive information from source documents, extract specific information from sensitive source documents, aggregate or statistically analyze information from multiple source data records 55. The autonomous user equipments 299 are further configured to conditionally process individual source data records 55 and reference data based on patterns within the source data, perform complex processing that requires source data from multiple source data records 55 and reference data, and perform hybrid combinations of any of the previously defined processing types, optionally in combination with other processing types.

In one embodiment, the system 30, with respect to an individual organization 40, wherein the organization 40 requires encrypted private blockchains 50 that contain confidential business records 55 to be maintained for the benefit of authorized individuals 41 that may be inside or outside the organization 40, which access and update the blockchains 50 via user devices 200, supported by the authorized persons 42 that operate the autonomous user equipments 299, that process and update blockchains 50 in response to the authorized persons 42 instructions in the blockchains 50, which optionally interact with the outside world via local inputs and outputs.

The usage of autonomous user equipments 299 to process encrypted data records 55 within blockchains 50 is highly significant, because it supports automated processing of encrypted data, within an implementation context whose security can be independently validated. The autonomous user equipments 299 is a special case of the user device 200, wherein the inputs and outputs normally exchanged with a human user are replaced by inputs and outputs in the blockchain, and the processing intentions of the human user are replaced by the instructions documented in the block-chain 50 by the authorized persons 42.

The requirement for authorized persons 42 to operate the autonomous user equipments 299 is fairly obvious, because any untrusted parties operating any autonomous user equipments 299 would be in a position to directly attack the autonomous user equipments 299, or cause, or allow, it to be attacked. The identification of users inside and outside the organization 40 as authorized individuals 41, reflects the expectation that users have a legitimate interest in the data, but may not be employed or directly engaged by the organization 40.

This is particularly relevant in relation to authorization of autonomous processing of data records 55 in the blockchain 50, because it means that the authority of the interested party 41 may be derived through a long and complex line of reasoning that is distributed across multiple blockchains 50, within the overall system 30.

For example, an organization 40 may grant limited access to data records 55 in a blockchain 50 to a customer organization 40, where those data records 55 relate to the contractual relationship between the organizations 40, and the customer organization 40 may make a similar grant to their customer organizations 40, which would indirectly confer access rights to end customer organization 40 to access data records 55 of the original organization 40.

In another embodiment, it is anticipated that the autonomous user equipments 299 will be used to support big data processing and artificial intelligence (AI) and machine learning (ML) functionalities, where extremely complex processing may be performed by the devices. It is also anticipated that security hardened devices will be created that include large numbers of potentially very powerful server computers or secure devices, and that these would be operated by cloud service providers, who could allocate physical computers or secure devices to individual customers or groups. The autonomous user equipments 299 can perform arbitrarily complex processing, including AI and ML that is equivalent to the processing that might be performed by a human user.

Figure 10:
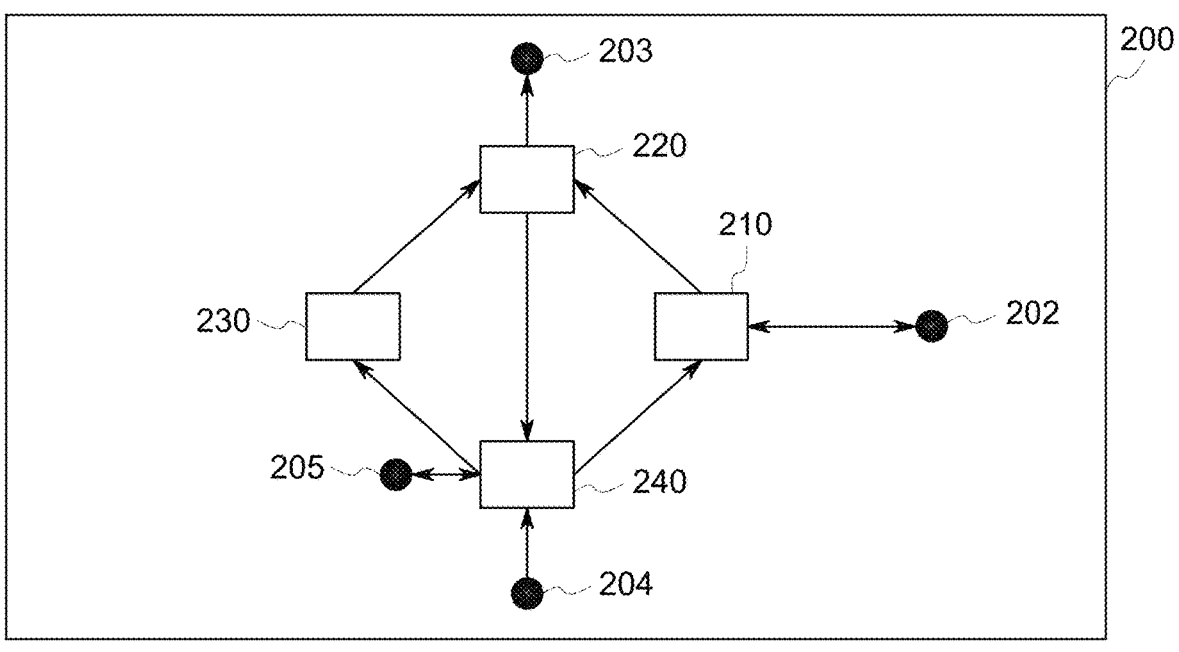
FIG. 10 illustrates a block diagram of structure and permitted data flows within a secure user device, in accordance with embodiments of the invention.

FIG. 10 illustrates a structure and data flows permitted within a secure user device 200. In one embodiment herein, each user device 200 comprises a network interface 202, an output interface 203, an input interface 204, a storage interface 205, a secure processor 230, an output processor 220, an input processor 240, and a network processor 210. The network interface 202 is configured to communicate data to and from external storage nodes 100 and other network devices. The output interface 203 is configured to display output data and the input interface 204 is configured to provide input data. The storage interface 205 is capable of providing persistent storage and the secure processor 230 is configured to request information from the blockchains 50 via the output processor 220, and receive requested information from the blockchains 50 via the input processor 240. In one embodiment herein, the output processor 220 is configured to receive the information from the network processor 210 and the secure processor 230, and display the requested information to the user.

The network processor 210 is connected to the network interface 202. The network interface 202 is configured to allow the network processor 210 to initiate connections to other devices on external networks. The other devices include the user devices 200. The input processor 240 is configured to connect with the input interface 204 for receiving information from the authorized users, and send information to the network processor 210 and the secure processor 230, and also receive information from the output processor 220 through respective unidirectional communication links. The secure processor 230 is configured to receive the information from the input processor 240, and send the information via the output processor 220 through respective unidirectional communication links. The output processor 220 is configured for receiving the information from the network processor 210 and the secure processor 230 and displaying the information to the authorized users through the output interface 203, and optionally sending the information to the input processor 240. The network processor 210, the input processor 240, the secure processor 230, and the output processor 220 are configured to validate the received information and add validation data to the transmitted information. The storage interface is configured to receive and send data to the input processor 240 or the secure processor 230 from temporary and persistent storages through respective unidirectional communication links.

In another embodiment herein, the user devices 200 are adapted to communicate with the plurality of storage nodes 100 through the proxy server 300.

In another embodiment, the outbound network interface 202 is responsible for enabling the user device 200 to initiate connections with other devices on the external network. The output interface 203 is designed to send data exclusively to local devices, while the input interface 204 can only receive data from local devices. The storage interface 205 can both send and receive data from temporary storage.

In another embodiment, the network processor 210 can only send data to the output processor 220 and the outbound network interface 202. The output processor 220 can only send data to the output interface 203 and the input processor 240. The secure processors 230 can only send data to the output processor 220. Finally, the input processor 240 can only send data to the secure processors 230, the network processors 210, and the storage interface 205. In one embodiment, the flow of data between processors is additionally regulated by utilizing the unidirectional communication links. These unidirectional communication links ensure that data transmission occurs strictly in one direction, thereby enhancing security measures and controlling the exchange of information between processors effectively.

In another embodiment, the user device 200, as shown in FIG. 10, consists of three external interfaces for local input, local output, and remote network connections. Additionally, it has four internal components for input processing, output processing, network processing, and secure data processing. Data connections within the user device 200 are directional, which means that data can only be transmitted between components in the directions specified in the FIG. 10. For instance, data can flow from the input interface 204, the storage interface 205, and the output processor 220 to the input processor 240. Similarly, data can flow from the input processor 240 and the outbound network interface 202 to the network processor 210. Furthermore, data can also flow from the network processor 210 and the secure processor 230 to the output processor 220. Data can also flow from the input processor 240 to the secure processor 230, from the input processor 240 to the storage interface 205, and from the output processor 220 to the output interface 203. The components within the user device shown in FIG. 10 can be implemented either physically in hardware or logically using virtual machines, containers, or processes. The directional data flows can be enforced through either physical or logical mechanisms.

The input interface 204 can be connected to various local input devices such as a keyboard, mouse, or any other device that is capable of providing input data. Similarly, the output interface 203 can be connected to a display or any other device that is capable of utilizing output data. These connected local devices may be linked to both the local input and output interfaces 203. The storage interface 205 can be connected to a magnetic hard disk, solid-state disk, persistent memory, or any other device that can provide persistent storage. Finally, the outbound network interface 202 can be connected to an Ethernet network, USB network, or any other network capable of transmitting data to and from external storage nodes 100 and other network devices.

The secure processor 230 presents information to the user via the output processor 220, and receives information from the user via the input processor 240. The secure processor 230 requests information from the blockchain 50 via the output processor 220, and receive requested information from the Blockchain 50 via the input processor 240. The secure processor 230 decrypts information received from the Blockchain 50 and encrypt information sent to the blockchain 50, optionally using private keys that it stores on behalf of the user, or using external security tokens that are connected via the input interface 204 and output interface 203.

The network processor 210 is configured to optionally present information to the user via the output processor 220, and receive information from the user via the input processor 240. The output processor 220 is configured for receiving information from the network processor 210 and the secure processor 230, and displaying information to the user. The output processor 220 is configured to optionally sending information to the input processor 240.

Figure 11:
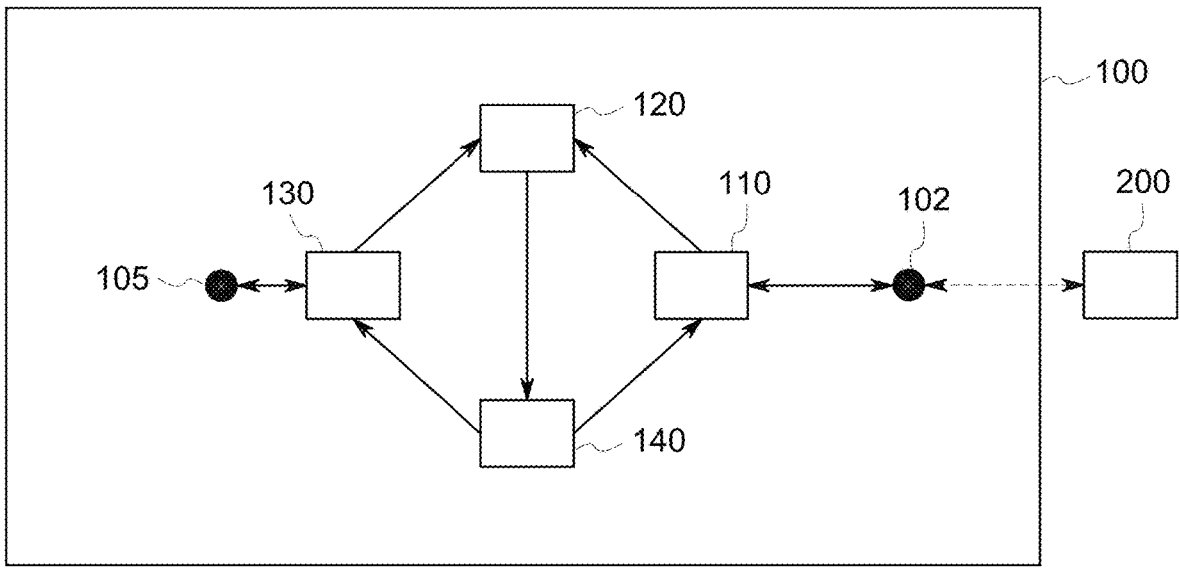
FIG. 11 illustrates a block diagram of structure and permitted data flows within a secure storage node, in accordance with embodiments of the invention.

FIG. 11 shows the same aspect of the invention applied to a secure storage node 100. In one embodiment herein, each autonomous user equipment comprises an inbound network interface 102, a local storage interface 105, a local input processor 140, a network processing unit 110, a secure processing unit 130, and an output processor 120. In one embodiment herein, the inbound network interface 102 is configured to enable a connection between the at least one autonomous user equipment and the at least one user device on an external network. The network processing unit 110 is configured to send the data records 55 to the output processor 120 and the inbound network interface 102. The secure processing unit 130 is configured to connect to a local storage interface 105, which sends and receives data from a persistent storage. The secure processing unit 130 is configured to send the data records 55 to the output processor 120 and the local storage interface 105.

In one embodiment herein, the output processor 120 is configured to send the data records 55 to the local input processor 140, which ensures that data flows permitted to send data records 55 to a storage node to be routed from the network processing unit 110 that connects to the external network via the output processor 120 and the local input processor 140 to the secure processing unit 130 and also prevents unauthorized data records 55 to reach the secure processing unit 130.

FIG. 11 illustrates the structure and data flows permitted within a secure storage node 100. In one embodiment, the inbound network interface 102 allows the user devices 200 on the external network to establish connections with the secure storage node 100. The storage interface 205 is responsible for sending and receiving data from persistent storage. The network processing unit 110 is configured to only send data to the inbound network interface 102 and the output processor 120. Similarly, the output processor 120 is configured to only send data to the input processor 140. The secure processing unit 130 is configured to only send data to the output processor 120 and the storage interface 105. Lastly, the input processor 140 can only send data to the network processing unit 110 and the secure processing unit 130.

It is important to note that the permitted data flows require data records 55 sent to the storage node 100 to be routed from the network processing unit 110 that connects to the external network via the output processor 120 and the input processor 140 to the secure processor 230. The consequence of this enforced routing is that it is not possible for unauthorized data records 55 to reach the secure processing unit 130 unless they have previously been independently validated by three other processors, and it is desirable for the processors to be manufactured by different vendors, and to run different virtualization systems and operating systems, and different application software to validate the data records 55.

Enforced routing in the reverse direction requires data records 55 to be independently validated by three processors before it can be transmitted over the external network, which provides three independent opportunities to block unauthorized release of data records 55.

It is important to note that the processing requirements for the local input processor 140 and the output processor 120 are particularly light in the context of the storage node 100, which means that they are implemented using low-energy microcontrollers, rather than microprocessors that require more power, which means that they employ different technology from the secure processing unit 130 and the network processing unit 110, which substantially increases the complexity of an cyber-attack.

It is anticipated that the network process could be replaced with a simple interface in some configurations, where the network processing unit 110 was not required to perform any processing, other than ensuring directional data flow.

It is also anticipated that the secure device aspect may become a fundamental component of a secure blockchain network, where the integrity of the network was in part assured by the security offered by the secure device design. It is also anticipated that secure devices could become a fundamental component in IoT and ICS network implementations, where the secure device acts as a secure interface to trusted networks that might deploy less secure devices that need to be protected from attacks from the wider network or internet.

Figure 12:
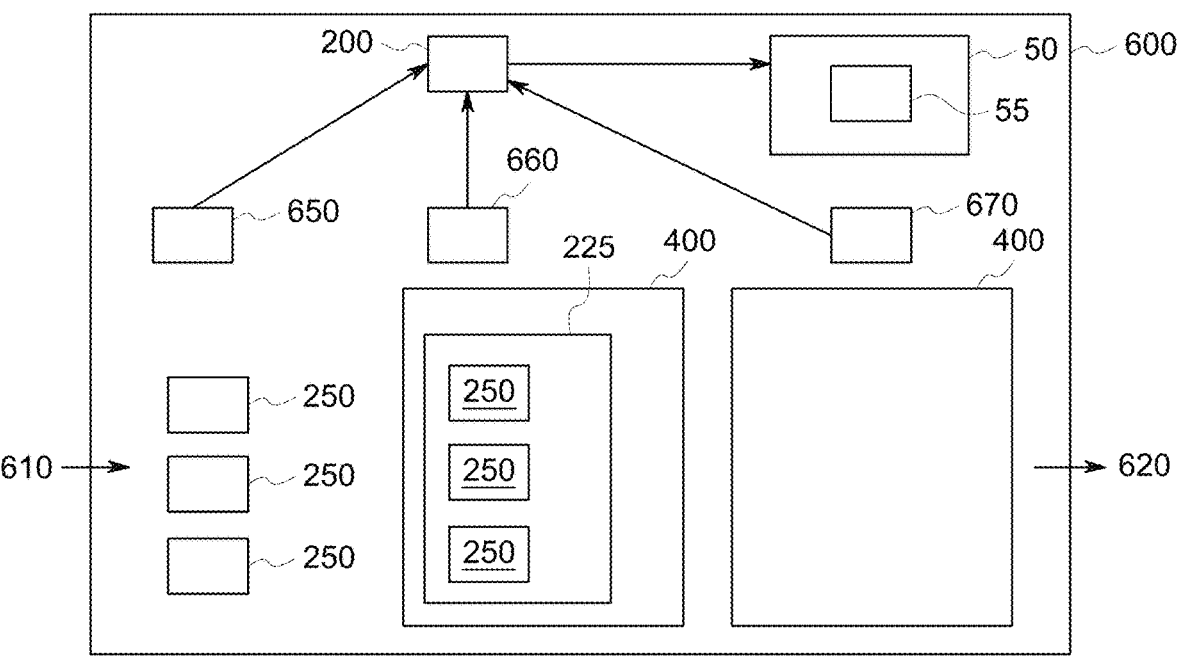
FIG. 12 illustrates a block diagram of a security hardened device, in accordance with embodiments of the invention.

FIG. 12 illustrates a security hardened device 400 that has been designed to be secure against tampering. In one embodiment herein, the user devices 200 are enclosed within a tamper-resistant and tamper-evident enclosure 225 of a security hardened device 400. The security hardened device 400 is assembled within a security hardened facility 600 that is operable to automatically collect and store cyber security assurance data within the blockchains 50. In one embodiment herein, the plurality of storage nodes 100 is further configured to store erasure encoded reference data shards that are distributed across the plurality of storage nodes 100 connected in the ring structure 10, operable to collectively preserve integrity and availability of stored data records 55, and control access to the data records 55 by consensus between the plurality of storage nodes 100 connected in the ring structure 10.

In one embodiment herein, the plurality of storage nodes 100 and user devices 200 are configured to process the data records 55 and associated digital signatures stored within the blockchains 50, shards of associated reference data, identity authors of the each data record 55, context of each data record 55, the context of associated reference data, and the cryptographic hash of the contents of each data record 55 and any associated reference data. In one embodiment herein, the data records 55 in the blockchains 50 and associated reference data includes information that represents one or more of user generated requests, user and machine generated statements of fact, user or machine generated reference data, user and machine generated badges of authenticity, and supporting evidence, wherein the supporting evidence optionally includes human-viewable surveillance of the real world and sensor data captured from the real world.

In one embodiment herein, the user devices 200 are configured to encrypt the data records 55 proposed for storage in the blockchain before distributing it across the plurality of storage nodes 100, wherein the user devices 200 are configured to encrypt reference data before creating reference data shards that are distributed across the plurality of storage nodes 100. The encryption keys used to encrypt the data records 55 are themselves encrypted and stored within the data records 55 that are previously stored in the blockchain. The recursive process of managing encryption keys involve both symmetric encryption and asymmetric encryption.

In one embodiment herein, the plurality of storage nodes 100 is configured to permanently delete blocks of data records 55 within the blockchain without compromising the integrity of the blockchain by using Merkel Trees or Merkel Lists to represent the blockchain structure. The plurality of storage nodes 100 that replicate and store copies of a blockchain 50 are operable to enforce data retention policies, whereby the plurality of storage nodes 100 are operable to reliably retain data records and reference data shards for a specified minimum retention period. The plurality of storage nodes 100 are operable to review the retention policy applicable to data records and reference data shards that have been stored for longer than the specified minimum retention period.

In one embodiment herein, the user devices 200 are further configured to use a security token to digitally sign transactions that contain one or more data records 55 intended for storage in the blockchain using the private key stored in the security token, and subject to a physical action detected by the security token that confirms consent of the user. In one embodiment herein, the security token stores a private key associated with an authorized user.

In one embodiment herein, the user devices 200 are further configured to require specific types of data records 55 to be digitally signed using a private key that is stored on another security token that associated with the authorized user.

In one embodiment herein, the user devices 200 are further configured to apply additional layers of encryption, which is only be decrypted by the autonomous user equipments 299 that are designated as gatekeepers. The autonomous user equipments 299 are configured to perform additional validation on the requests before deciding whether to remove the additional layers of encryption on behalf of a specific user of a specific user device at a specific point in time.

In one embodiment, the user devices 200 is made up of one or more components 250, which are installed in the tamper-resistant and tamper-evident enclosure 225. The identity of the components, as well as the inspection, assembly, and testing process, were all recorded by surveillance devices 650, 660, and 670. These records were stored as confidential business records 55 within the blockchain 50 by the user devices 200. The security hardened device 400 was assembled in a security-hardened facility 600, where surveillance device 650 captured the records of the goods inward inspection process, surveillance device 660 captured the records of the assembly and sealing process, and surveillance device 670 captured the records of the goods outward inspection process. These records allowed the goods out 620 to be reconciled with the goods inward 610 through confidential records 55 stored in an encrypted private blockchain 50.

The security hardened device 400 shown in FIG. 12 comprises one or more computer devices within the tamper-resistant and tamper-evident enclosure 225, with optional mounting points for permanent attachment to immovable infrastructure, which has been assembled within a security hardened facility that automatically collects and stores cyber security assurance data within the blockchain 50, so interested parties are allows to view evidence of the inspection and assembly of components, device testing, enclosure sealing, device and identification, plus any reviews and security assessments of the assurance data by independent third-parties. The security-hardened device 400, is a meticulously crafted system comprising multiple components 250. The components 250 are securely installed within the tamper-resistant and tamper-evident enclosure 225, which is both tamper-resistant and tamper-evident. Throughout its assembly process within a highly secure facility, the device's identity, component inspections, assembly steps, and product testing are meticulously documented.

The tamper-resistant and tamper-evident enclosure 225 enclosure is comprised of one or more of steel, aluminium, metallic alloys, steel-concrete-steel (SCS) composite, plastic, fibre-reinforced plastic, or carbon fibre; and tamper evidence is achieve by one or more of tamper evident paints or coatings, or physical design of the enclosure to ensure irreversible damage to the components within the enclosure 225 in the event of tampering, or components within the enclosure 225 being operable to destroy cryptographic materials in response to sensor data that implies possible tampering.

The outer enclosure may optionally be enclosed within a standard shipping container; and the surveillance may include CCTV cameras in one or more of the following locations, outside the outer enclosure, within spaces created by the partition walls, or within the inner enclosure. The surveillance may optionally include one or more of sound recording, or vibration recording, or electromagnetic field recording; and the surveillance may optionally be monitored by personnel in another security hardened facility.

Surveillance devices (650, 660, and 670), actively record every phase of this process. These recordings are safeguarded as confidential business records 55, stored within a blockchain 50 utilizing advanced encryption methods. The user devices 200, play a vital role in ensuring the integrity of this record-keeping process. The inspection of incoming goods is meticulously documented through surveillance device 650. Subsequent to assembly and sealing, surveillance device 660 captures detailed records of these critical steps. Finally, the inspection process for outgoing goods is similarly recorded by surveillance device 670. This comprehensive documentation and secure storage mechanism, facilitated by encrypted private blockchain technology, enable seamless reconciliation between inbound 610 and outbound 620 goods.

For most applications, pressed steel is preferred for the enclosure due to its affordability and resistance to tampering.

Its effectiveness depends on sufficient thickness and securely sealed edges, achieved through chemical or heat welding. Additionally, steel offers excellent heat dissipation. For applications requiring lightweight construction and superior thermal conductivity, aluminum can be a viable alternative. It can be combined with steel for enhanced security. In scenarios demanding exceptional thermal management, heat pipes or liquid cooling systems may be necessary.

Steel-Concrete-Steel (SCS) composite construction emerges as a promising option for the enclosure due to its cost-effective rigidity. Alternative fillers beyond concrete are also worth exploring to create stiff structures. This factor needs to be carefully balanced with the enclosure's design, aiming for irreparable damage to internal components in case of tampering. Minimizing electromagnetic radiation is another crucial design challenge for secure devices. This radiation could potentially be exploited to glean information from internal processors or devices. Therefore, strategies to effectively mitigate such emissions are essential.

Figure 13:
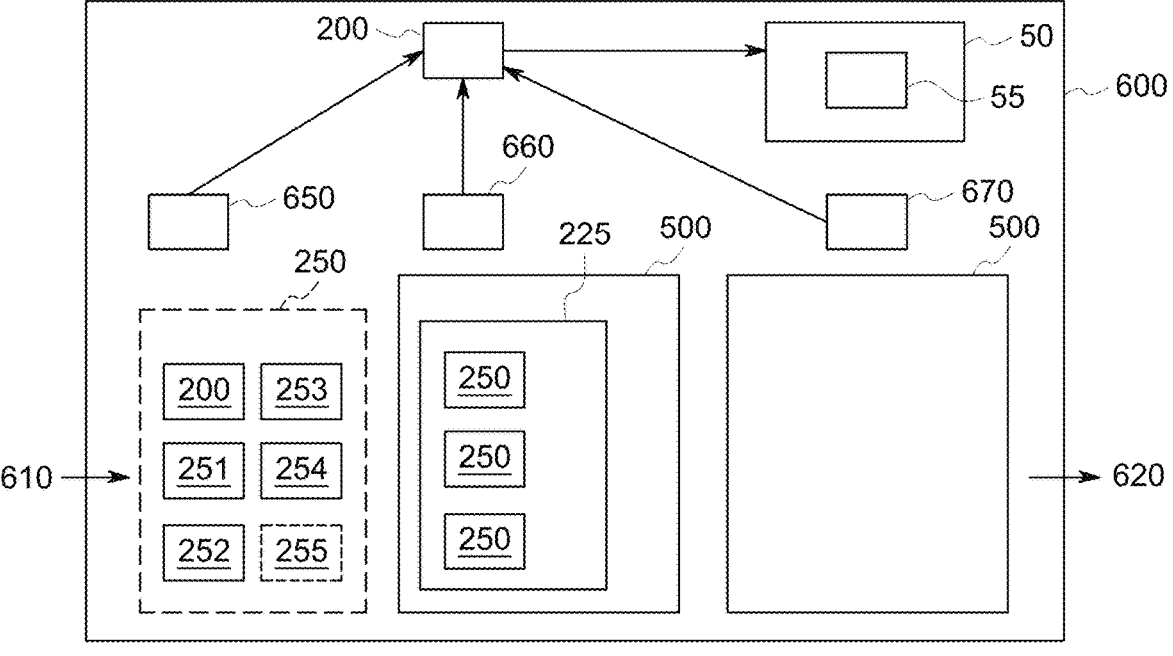
FIG. 13 illustrates a block diagram of a security hardened workstation, in accordance with embodiments of the invention.

FIG. 13 shows a security-hardened workstation 500. The security-hardened workstation 500 is made up of one or more components 250 that are installed within an enclosure 225. The enclosure 225 is tamper-resistant and tamper-evident, and the identity, inspection, assembly, testing, and surveillance during the process are recorded by surveillance devices 650, 660, and 670. These records are stored as confidential business records 55 within the blockchain 50 by the user devices 200, while the security-hardened workstation 500 is assembled within a security-hardened facility 600.

During the assembly process, the goods inward inspection process is captured using surveillance device 650, the assembly and sealing process is captured using surveillance device 660, and the goods outward inspection process is captured using surveillance device 670. This allows the reconciliation of goods out 620 with goods inward 610 through confidential records 55 stored in an encrypted private blockchain 50. The components 250 of the workstation comprise a user device 200, user input devices 251, user display devices 252, privacy shields 253, and vibration dampening mechanisms 254. Additionally, the workstation 500 may optionally include a security-hardened headset 255. The security-hardened workstation is tamper-resistant and tamper-evident, with a security door that is monitored, and optionally controlled, via the blockchain. Surveillance of or tampering with the components and interconnections is difficult, even when the security door is open. The workstation also has optional mounting points for permanent attachment to immovable infrastructure.

Finally, the workstation has been assembled within a security-hardened facility that automatically collects and stores cyber security assurance data within the blockchain 50. This allows interested parties to view evidence of the inspection and assembly of components, device testing, enclosure sealing, device and identification, as well as any reviews and security assessments of the assurance data by independent third-parties.

Figure 14:
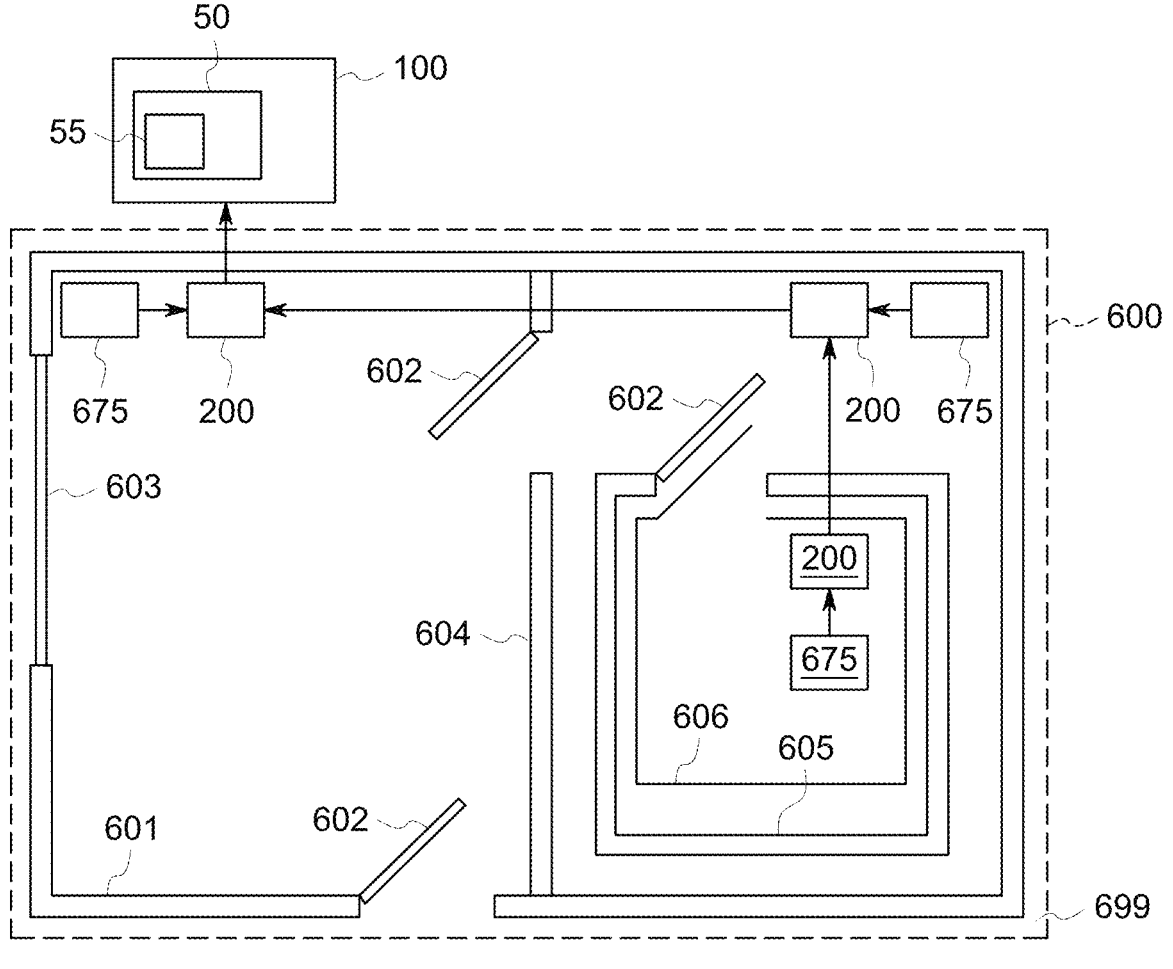
FIG. 14 illustrates a block diagram of a security hardened facility, in accordance with embodiments of the invention.

FIG. 14 depicts the security-hardened facility 600. It is composed of a concrete outer enclosure 601. The enclosure 601 contains security doors 602, and optional security windows 603. The enclosure also has partition walls 604, with security doors 602. In addition, there is an optional concrete inner enclosure 605, with a Faraday cage 606, and the security doors 602. The user devices 200, receive confidential business data 55, from surveillance devices 675. These user devices 200 are configured to replicate the confidential business data 55, via other user devices 200, to the storage nodes 100. The storage nodes 100 maintain encrypted private blockchains 50 that persistently store the confidential business data 55.

The concrete outer enclosure 601 is configured to be optionally enclosed within a standard shipping container 699. The security-hardened facility 600 contains one or more concrete partition walls with security doors. It also has one or more user devices 200 with attached surveillance devices and access control actuators. These record surveillance and actuator data in one or more blockchains 50. The facility also has an optional concrete inner enclosure with a Faraday cage. It is physically isolated from the outer enclosure and partition walls with vibration-absorbing mountings.

For an instance, the security hardened facilities that are being used as secure modular offices and secure modular factories, where the critical requirement is remote surveillance and access control, with records securely maintained within the blockchain 50 in order to support security assurance to activities conducted within the facility. The outer enclosure is installed within standard shipping containers, and for thermal insulation and cladding to be applied to the outside. Any additional mechanisms can be added to allow the shipping containers to be installed easily within residential properties, in particular to ensure easy movement and alignment on an insulated foundation based. These facilities are equipped with heat exchangers to allow ventilation from the outside without losing heat, and for the ventilation ducts to be designed to minimize potential for invasive attacks.

In another embodiment, the FIG. 1 shows reference data and the data records 55 that is stored within the blockchain 50, which represent requests, responses, statements, badges, and supporting evidence in the real world, wherein the identity of the author and the context of each reference data and data record 55 are proven beyond reasonable doubt through digital signatures and previous data records 55.

The storage nodes 100 are operable to collectively respond by consensus to requests contained within data records 55 that are stored within a blockchain 50. Each storage node 100 is configured to independently generate responses to these requests and autonomously generate data shards from data records 55 in the blockchain 50 using erasure encoding. Each storage node 100 will only send a subset of the response data shards to any user device 200, so the requesting user device 200 cannot reconstruct the complete response without first receiving response shards from the majority of storage nodes 100. A complete response is required to allow the user device 200 to decrypt critical aspects of the response data.

This data may be used to control access to machine-readable representations of user-generated requests, user and machine-generated statements of fact, user or machine-generated reference data, user and machine-generated badges of authenticity, and supporting evidence that includes human-viewable surveillance and sensor data of the real world. The identity of the author, context of each data record 55 and any associated reference data, and the cryptographic hash of the contents are proven beyond reasonable doubt through the network of digital signatures on data records 55 that are stored in one or more blockchains 50. Consensus about machine-generated responses is implicitly proven beyond reasonable doubt.

This aspect may be extremely important within generic blockchain systems, where the individual nodes 100 are capable of responding independently to requests about the blockchain 50 contents, but the system 30 security requirements mean that it is desirable for them to only respond by consensus. It is explicitly anticipated that storage nodes 100 will only respond to validated requests within the blockchain 50, and that they will also independently validate any special conditions that may be attached to the recipient's authority to make such requests.

The system 30 supports global blockchains 50 and provenance blockchains 50 and encrypted private blockchains 50 that contain confidential business records 55 for organizations 40 with distributed storage of referenced digital artefacts that are all maintained for the benefit of interested parties, who rely upon the records of the organization 40, and may continue to do so after the organization 40 ceases to exist.

The system 30 requires business data records 55 in the blockchains 50 to be digitally signed using a private key that is known only to the author of the record, which can therefore be used to verify the provenance of the data records 55 by any storage node 100 or user device 200, which knows the public key of the author.

The data records 55 may optionally be digitally signed using multiple private keys, creating one or more digital signatures, which allow their provenance to be verified. In particular, it is expected that at least one of the digital signatures will use quantum-safe cryptography, because there is a danger that digital signatures could otherwise be forged using quantum computers. However, it is not possible for historic data records 55 in the blockchain 50 to be modified, even if the authorization of future data records 55 can be forged, provided the blocks within the blockchains 50 are signed using quantum safe digital signatures.

The reference data and optionally some aspects of the data records 55 may be encrypted by the user device 200 using a symmetric key, which may be further encrypted using the public key of a user, before being stored in the private blockchain 50, so that the authorized persons 42 can use its private key plus information previously stored in the blockchain 50 to decrypt the data and encrypted aspects of the data records 55.

This highlights the need for using quantum-safe public key encryption today in order to protect encrypted data that has been successfully stolen from being decrypted in future, once quantum computers of sufficient power be economically viable for the attackers.

The reference data and data records 55 in the global blockchain 50 represents the statements made by each organization to interested parties within the system 30 about their commitment to participate in the system 30, the technical relationships between storage nodes 100 that form each primary ring 11 and generic ring 10, and specific contractual relationships between organizations and interested parties.

The data records 55 in the provenance blockchains 50 represents the evidence that supports provenance assurance for the data records 55 in the private blockchains 50, at more frequent intervals that can be supported by the global blockchain 50.

The reference data and data records 55 in a private blockchain 50 may represent any hierarchically organized data structured, which may be created and updated by authorized individuals 41 of an organization 40, including access control permission structures that allow data records 55 and reference data to be selectively shared with other authorized individuals 41.

The preferred implementation of permissioned access to data records 55 will employ cryptographic controls, which ensure that it is physically impossible to unauthorized user to decrypt the data records 55 and reference data unless they have been granted access to the required encryption keys through the authorized access control system 30.

In another embodiment, the private blockchain 50 contains reference data and data records 55 that can represent encrypted communications between the authorized persons 42 or groups of users. Additionally, these records may also represent a fully versioned file system 30 that includes document management features, such as data classification, release stages, authorizations, and version comments. Moreover, the private blockchain 50 can also be used to manage individual tasks within projects, including workflow processing and automated processing, through encrypted business management systems. Furthermore, the reference data and data records 55 in the private blockchain 50 can also be used to store digitally signed requests, responses, statements, badges, affirmations, and evidence that apply in a specific context.

The encryption key management scheme should generically allow symmetric encryption keys to be associated with collections of items such as folders, files, and versions, which are used to encrypt data and aspects of the data associated with each item, so that user public keys can be used to share entire sub-trees of information with the user. The encryption key management scheme may also allow the symmetric encryption keys used to encrypt reference data and aspects of the data records 55 to be encrypted with a second symmetric encryption key before being encrypted with gateway user public keys, where the second encryption key is encrypted with the public key of another user or users, who act as gatekeepers that must independently verify the validity of the access request before granting the user access to the second encryption key.

The data record 55 validation process will verify the digital signature associated with the record, and confirm that the user that signed the record has been authorized to sign data records 55 through a previous record stored in the Blockchain, and that the authorization has not been revoked.

After the rebuilt data record 55 has been independently validated by the storage node 100, it will be tentatively added to the private Blockchain 50, and any action requested by the data record 55 will only be taken after the storage nodes 100 have confirmed consensus about the proposed block in the blockchain 50. If the data record 55 requests storage nodes 100 to persistently store received data shards, then each node may perform additional validation before persistently storing the received data shards. If the data record 55 requests storage nodes 100 to retrieve data shards, then each storage node 100 may perform additional validation before retrieving data shards from persistent storage.

In a preferred embodiment, proxy servers 300 as shown in FIG. 8 are used as intermediaries between the user devices 200 and the storage nodes 100, so that interception of the communications from a user device 200 does not expose the IP address of the storage nodes 100, and so that the storage nodes 100 only communicate with other storage nodes 100 and the proxy servers 300, allowing more restrictive firewall rules to applied to their external communications. One or more proxy servers 300 may be used to provide access to one or more storage servers 100.

The ability to maintain multiple encrypted blockchains 50 that contain hierarchical information structures with sophisticated cryptographic access control mechanisms is critical to the intentions of this invention, and it is specifically intended that the proposed system 30 will support very large numbers of organizations, who require secure information management systems for the own usage, and also need to be able to offer assurance to interested parties that the information will remain available regardless of what happens to the organization.

It is specifically intended that networks of organizations will be able to grow organically, where more organizations are added by consent of existing member, with an expectation that all members will contribute to the network by maintain one or more storage nodes 100 that operate relatively reliably, and replacing such nodes 100 in the event of them failing, so that the overall integrity of the network is preserved. It is very likely that most if not all storage nodes 100 will be operated by cloud service providers, who offer physical or virtual hardware to the organizations, with the effect that the nodes 100 themselves and the network are massively scalable. It is also anticipated that organizations may contract directly with cloud service providers, but that in some cases it may be preferable for them to contract via trustees that are responsible for maintaining the operation of the storage nodes 100 on behalf interested parties.

The blockchain 50 and associated reference data includes information that represents and supports one or more of the following applications: an end-to-end encrypted messaging system; an encrypted versioned file system, an encrypted document management system, an encrypted business data management system, an encrypted logged database. The decryption of encrypted data is optionally restricted through additional encryption that requires delegated access to encryption keys for specific classifications or collections of data, in addition to encryption keys required by the standard hierarchical delegation of access rights.

Figure 15:
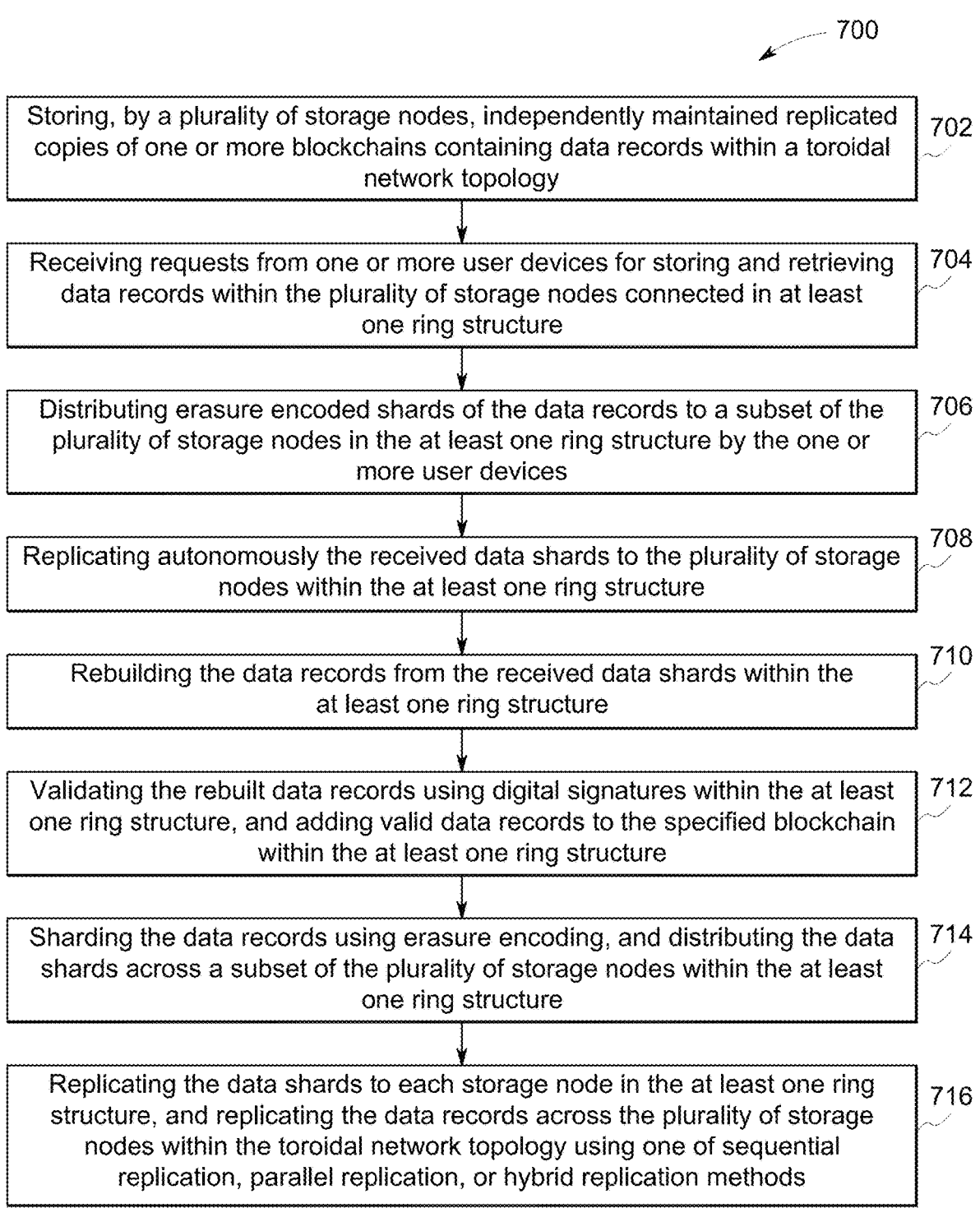
FIG. 15 illustrates a flowchart of a method for assuring cyber security across supply chains through the system.

FIG. 15 refers to a flowchart 700 of a method for assuring cyber security across supply chains through the system 30. At step 702, the plurality of storage nodes 100 store independently maintained replicated copies of the one or more blockchains 50 containing data records 55 within the toroidal network topology 20. At step 704, requests are received from the one or more user devices 200 for storing and retrieving data records 55 within the plurality of storage nodes 100 connected in at least one ring structure 10.

At step 706, the erasure encoded shards of the data records 55 are distributed to a subset of the plurality of storage nodes 100 in the at least one ring structure 10 by the one or more user devices 200. At step 708, the received data shards are autonomously replicating to the plurality of storage nodes 100 within the at least one ring structure 10.

At step 710, the data records 55 are rebuilt from a subset of the received data shards within the at least one ring structure 10. At step 712, the rebuilt data records 55 are validated using digital signatures within the at least one ring structure 10, and valid data records 55 are added to the specified blockchain within the at least one ring structure 10. At step 714, the data records 55 are shared using erasure encoding, and distributing the data shards across a subset of the plurality of storage nodes 100 within the at least one ring structure 10. At step 716, the data shards are replicated to each storage node in the at least one ring structure 10 and the data records 55 are replicated across the plurality of storage nodes 100 within the toroidal network topology 20 using one of sequential replication, parallel replication, or hybrid replication methods.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

The claimed invention is:

1. A system for assuring cyber security across supply chains, comprising
    a plurality of storage nodes connected in ring structures within a toroidal network topology, wherein said plurality of storage nodes in each ring structure are fully connected to each other,
    wherein said plurality of storage nodes in the toroidal network is configured to store independently maintained copies of one or more blockchains that contain data records, wherein each blockchain is replicated across a subset of said plurality of storage nodes connected in the ring structures, which extend in one or more dimensions; and
    one or more user devices configured to allow users to request for storing and retrieving the data records in said plurality of storage nodes that are connected in at least one ring structure,
    wherein said one or more user devices submit the data records by distributing erasure encoded shards of the data record to a subset of the storage nodes in one ring,
    wherein said plurality of storage nodes connected in the ring structure is adapted to autonomously replicate data shards received to all other storage nodes in the same ring, and rebuild the data records from a subset of the received data shards, and validate the rebuilt data records using digital signatures, and add valid data records to the specified blockchain.

2. The system for assuring cyber security across supply chains of claim 1, wherein the data records are sharded by storage nodes using erasure encoding, and the data shards are distributed across a subset of the storage nodes within a ring, and those storage nodes replicate the data shards to all nodes in the ring,
    wherein said plurality of storage nodes replicate the data records across a subset of said plurality of storage nodes connected in multiple dimensions within the toroidal network by one of several methods include a sequential replication, a parallel replication, and a hybrid replication,
    wherein
    the sequential replication is configured for distribution and replication of the data shards in one dimension at a time;
    the parallel replication is configured for distribution and replication of the data shards across one or more dimensions concurrently; and
    the hybrid replication is configured for distribution and rebuilding of the data records using a combination of several methods.

3. The system for assuring cyber security across supply chains of claim 1, wherein said one or more user devices are configured to shard blockchain requests, and distribute the data shards across the subset of one ring of nodes, either directly or via intermediary proxy servers.

4. The system for assuring cyber security across supply chains of claim 1, wherein said one or more user devices are adapted to autonomously communicate with said plurality of storage nodes for transferring data shards to a subset of said plurality of storage nodes connected in the ring structure.

5. The system for assuring cyber security across supply chains of claim 1, wherein said system comprises one or more autonomous user equipments configured to autonomously process and update the data records in the blockchains in response to one or more instructions added to the blockchains by authorized persons without direct user interactions, inputs or outputs, thereby ensuring encrypted data records can be processed securely without enabling access to the data by any human user, wherein said one or more autonomous user equipments are further configured to perform one of the following processing tasks:

redact sensitive information from source documents;

extract specific information from sensitive source documents;

aggregate or statistically analyze information from multiple source data records;

conditionally process individual source data records and reference data based on patterns within the source data;

other types of processing;

perform complex processing that requires source data from multiple data records and reference data; and perform hybrid combinations of any of the previously defined processing types.

6. The system for assuring cyber security across supply chains of claim 1, wherein said each storage node and said each user device comprises:

a network processor connected to a network interface, which is configured to allow the network processor to initiate connections to other devices on external networks;

an input processor configured to connect with an input interface for receiving information from the authorized users, and send information to the network processor through an unidirectional communication link;

a secure processor configured to receive the information via the input processor, and send the information via an output processor through respective unidirectional communication links, wherein the output processor is configured for receiving the information from the network processor and the secure processor and displaying the information to the authorized users through an output interface, and optionally sending the information to the input processor, wherein the network processor, the input processor, the secure processor, and the output processor are configured to validate the received information and add validation data to the transmitted information by verifying digital signatures on the information against keys stored in the blockchain, thereby preventing attackers to establish a command-response connection to the secure processor from outside the system; and a storage interface configured to receive and send data to the input processor or the secure processor from temporary and persistent storages.

7. The system for assuring cyber security across supply chains of claim 1, wherein said one or more user devices are adapted to communicate with said plurality of storage nodes through one or more proxy servers.

8. The system for assuring cyber security across supply chains of claim 1, wherein each storage node and each user device are implemented without an input interface and an output interface.

9. The system for assuring cyber security across supply chains of claim 1, wherein said one or more user devices, the one or more input and output interfaces, privacy shield and security hardened devices are enclosed within a tamper-resistant and tamper-evident enclosure of a security hardened workstation, wherein the security hardened devices are adapted to be assembled within a security hardened facility that is operable to automatically collect and store cyber security assurance data within a blockchain, wherein the security hardened facility is monitored by secure devices that capture information and cyber security assurance data about the build and test process and store it in the blockchain, thereby providing evidence to a customer and interested parties are able to view evidence of the inspection and assembly of components, device testing, enclosure sealing, and device identification, plus reviews and security assessments of assurance data by independent third-parties.

10. The system for assuring cyber security across supply chains of claim 9, wherein the security hardened workstation comprises a lockable door for enabling the authorized users to access the one or more input and output interfaces while preventing tampering with the privacy shield devices and restricting access to the user devices, wherein the system includes one or more security hardened facilities that are comprised of: a concrete outer enclosure with security doors and optional security windows; one or more concrete partition walls with security doors.

11. The system for assuring cyber security across supply chains of claim 1, wherein said tamper-resistant and tamper-evident enclosure is comprised of one or more of steel, aluminium, metallic alloys, steel-concrete-steel (SCS) composite, plastic, fibre-reinforced plastic, or carbon fibre, and achieves tamper evidence through tamper-evident paints or coatings, physical design that ensures irreversible damage to the components within in case of tampering, or components that destroys cryptographic materials based on sensor data suggesting possible tampering, wherein the privacy shield devices include one or more of physical louvres that are angled to allow viewing from a specific region only, or multi-layered printing on clear materials to achieve the same effect.

12. The system for assuring cyber security across supply chains of claim 1, wherein said plurality of storage nodes is further configured to store erasure encoded reference data shards that are distributed across said plurality of storage nodes connected in the ring structure, operable to collectively preserve integrity and availability of stored data records, and control access to the data records by consensus between said plurality of storage nodes connected in the ring structure.

13. The system for assuring cyber security across supply chains of claim 1, wherein said plurality of storage nodes and user devices are configured to:

process the data records and associated digital signatures stored within the blockchains, shards of associated reference data, identity authors of the each data record, context of each data record, the context of associated reference data, and the cryptographic hash of the contents of each data record and any associated reference data.

14. The system for assuring cyber security across supply chains of claim 1, wherein the data records in the blockchains and associated reference data includes information that represents one or more of user generated requests, user and machine generated statements of fact, user or machine generated reference data, user and machine generated badges of authenticity, and supporting evidence, wherein said supporting evidence optionally includes human-viewable surveillance of the real world and sensor data captured from the real world.

15. The system for assuring cyber security across supply chains of claim 1, wherein said user devices are further configured to encrypt the data records proposed for storage in the blockchain before distributing it across said plurality of storage nodes, wherein said user devices are configured to encrypt reference data before creating reference data shards that are distributed across said plurality of storage nodes, wherein the encryption keys used to encrypt the data records are themselves encrypted and stored within the data records that are previously stored in the blockchain, and the recursive process of managing encryption keys involve both symmetric encryption and asymmetric encryption.

16. The system for assuring cyber security across supply chains of claim 1, wherein said plurality of storage nodes is further configured to permanently delete blocks of data records within the blockchain without compromising the integrity of the blockchain by using Merkel Trees or Merkel Lists to represent the blockchain structure.

17. The system for assuring cyber security across supply chains of claim 1, wherein a blockchain and associated reference data includes information that represents and supports one or more of the following applications include an end-to-end encrypted messaging system, an encrypted versioned file system, an encrypted document management system, an encrypted business data management system, an encrypted logged database, wherein decryption of encrypted data is optionally restricted through additional encryption that requires delegated access to encryption keys for specific classifications or collections of data, in addition to encryption keys required by the standard hierarchical delegation of access rights.

18. The system for assuring cyber security across supply chains of claim 1, wherein said user devices are further configured to use a security token to digitally sign transactions that contain one or more data records intended for storage in the blockchain using the private key stored in the security token, and subject to a physical action detected by the security token that confirms consent of the user, wherein the security token stores a private key associated with an authorized user.

19. The system for assuring cyber security across supply chains of claim 1, wherein said user devices are further configured to require specific types of data records to be digitally signed using a private key that is stored on another security token that associated with the authorized user.

20. The system for assuring cyber security across supply chains of claim 1, wherein said user devices are further configured to apply additional layers of encryption, which is decrypted by the autonomous user equipments that are designated as gatekeepers, wherein said autonomous user equipments are configured to perform additional validation on the requests before deciding whether to remove the additional layers of encryption on behalf of a specific user of a specific user device at a specific point in time.

21. A method for assuring cyber security across supply chains through a computing system, comprising:

storing, by a plurality of storage nodes, independently maintained replicated copies of one or more blockchains containing data records within a toroidal network topology;

receiving requests from one or more user devices for storing and retrieving data records within said plurality of storage nodes connected in at least one ring structure;

distributing erasure encoded shards of the data records to a subset of said plurality of storage nodes in the at least one ring structure by said one or more user devices;

replicating autonomously the received data shards to said plurality of storage nodes within the at least one ring structure;

rebuilding the data records from a subset of the received data shards within the at least one ring structure;

validating the rebuilt data records using digital signatures within the at least one ring structure, and adding valid data records to the specified blockchain within the at least one ring structure;

sharding the data records using erasure encoding, and distributing the data shards across a subset of said plurality of storage nodes within the at least one ring structure; and replicating the data shards to each storage node in the at least one ring structure, and replicating the data records across said plurality of storage nodes within the toroidal network topology using one of sequential replication, parallel replication, or hybrid replication methods.

22. The method of claim 21, said system comprises one or more autonomous user equipments configured to autonomously process and update the data records in the blockchains in response to one or more instructions added to the blockchains by authorized persons without direct user interactions, inputs or outputs, thereby ensuring to prevent unauthorized users to decrypt the data records stored within the blockchains, wherein said one or more autonomous user equipments are configured to:

redact sensitive information from source documents;

extract specific information from sensitive source documents;

aggregate or statistically analyze information from multiple source data records; conditionally process individual source data records and reference data based on patterns within the source data;

perform complex processing that requires source data from multiple data records and reference data;

other types of processing; and perform hybrid combinations of any of the previously defined processing types.

23. The method of claim 21, wherein said each storage node and said each user device are configured to:

initiate connections to other devices on external networks through a network processor via a network interface;

receive information from the authorized users from an input processor via an input interface, and send information to the network processor through the input processor via an unidirectional communication link;

transfer the information from the input processor to a secure processor;

transfer the information to an output processor from the secure processor through respective communication links communication links, wherein the output processor is configured for receiving the information from the network processor and the secure processor, wherein the output processor and the network processor are configured to perform independent validation of the information;

display the information to the authorized users via an output interface, and optionally sending the information to the input processor, wherein the network processor, the input processor, the secure processor, and the output processor are configured to validate the received information and add validation data to the transmitted information by verifying digital signatures on the information against keys stored in the block-chain, thereby preventing attackers to establish a command-response connection to the secure processor from outside the system; and receive and send the information to the input processor from temporary and persistent storages via a storage interface.

24. The method of claim 21, wherein said one or more user devices, the one or more input and output interfaces, privacy shield and security hardened devices are enclosed within a tamper-resistant and tamper-evident enclosure of a security hardened workstation, wherein the security hardened devices are adapted to be assembled within a security hardened facility that is operable to automatically collect and store cyber security assurance data within a blockchain, wherein the security hardened workstation comprises a lockable door for enabling the authorized users to access the one or more input and output interfaces while preventing tampering with the privacy shield devices and restricting access to the user devices, wherein the security hardened facility is monitored by secure devices that capture information and cyber security assurance data about the build and test process and store it in the blockchain, thereby providing evidence to a customer and interested parties are able to view evidence of the inspection and assembly of components, device testing, enclosure sealing, and device identification, plus reviews and security assessments of assurance data by independent third-parties.

* * * * *